United States Patent
Kajiwara et al.

(10) Patent No.: US 9,378,558 B2
(45) Date of Patent: Jun. 28, 2016

(54) SELF-POSITION AND SELF-ORIENTATION BASED ON EXTERNALLY RECEIVED POSITION INFORMATION, SENSOR DATA, AND MARKERS

(71) Applicants: Yasuhiro Kajiwara, Kanagawa (JP); Tamon Sadasue, Kanagawa (JP); Kenichi Ozawa, Kanagawa (JP); Takayuki Saitoh, Kanagawa (JP)

(72) Inventors: Yasuhiro Kajiwara, Kanagawa (JP); Tamon Sadasue, Kanagawa (JP); Kenichi Ozawa, Kanagawa (JP); Takayuki Saitoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 132 days.

(21) Appl. No.: 14/473,155

(22) Filed: Aug. 29, 2014

(65) Prior Publication Data

US 2015/0071493 A1 Mar. 12, 2015

(30) Foreign Application Priority Data

Sep. 11, 2013 (JP) ................................. 2013-188553

(51) Int. Cl.
- *G06K 9/00* (2006.01)
- *G06T 7/20* (2006.01)
- *G06T 7/00* (2006.01)

(52) U.S. Cl.
CPC .............. *G06T 7/204* (2013.01); *G06T 7/0044* (2013.01); *G06T 2207/10016* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 6,453,223 B1* | 9/2002 | Kelly | ................... | G05D 1/0246 318/587 |
| 7,868,821 B2* | 1/2011 | Hoshizaki | ............... | G01S 19/45 342/357.42 |
| 8,862,395 B2* | 10/2014 | Richardson | ........ | G01C 21/3647 235/462.01 |
| 2004/0073360 A1* | 4/2004 | Foxlin | .................... | G01C 21/16 701/517 |
| 2005/0234679 A1* | 10/2005 | Karlsson | .............. | G05D 1/0272 702/181 |
| 2005/0256637 A1* | 11/2005 | Tazartes | ............... | G01C 25/005 701/408 |
| 2006/0244830 A1* | 11/2006 | Davenport | ............ | B61L 25/021 348/148 |
| 2006/0287812 A1* | 12/2006 | Takashima | ............. | G01C 21/00 701/446 |

(Continued)

FOREIGN PATENT DOCUMENTS

| | | |
|---|---|---|
| JP | 11-085387 | 3/1999 |
| JP | 2005-115500 | 4/2005 |

(Continued)

*Primary Examiner* — Wenpeng Chen
(74) *Attorney, Agent, or Firm* — Oblon, McClelland, Maier & Neustadt, L.L.P

(57) ABSTRACT

An information processing apparatus includes a self-position/self-orientation calculation unit calculating self-position and/or self-orientation in the predetermined coordinate system based on a marker in acquired imaged image data when it is determined that the marker exists within a predetermined area and the marker is imaged in the imaged image data and based on received position information and physical amounts measured by sensors for measuring the physical amounts to be used for autonomous navigation when the marker does not exist within the predetermined area or the marker is not imaged in the imaged image data.

9 Claims, 19 Drawing Sheets

(56) References Cited

U.S. PATENT DOCUMENTS

| | | | |
|---|---|---|---|
| 2006/0287819 A1* | 12/2006 | Brulle-Drews | G01C 21/3647 701/431 |
| 2008/0215231 A1* | 9/2008 | Breed | G08G 1/161 701/117 |
| 2008/0262718 A1* | 10/2008 | Farwell | G05D 1/0246 701/445 |
| 2009/0018772 A1* | 1/2009 | Watanabe | G01C 21/165 701/472 |
| 2009/0245681 A1* | 10/2009 | Kobayashi | G06T 7/0018 382/275 |
| 2009/0312871 A1* | 12/2009 | Lee | G01C 21/00 700/259 |
| 2010/0176987 A1* | 7/2010 | Hoshizaki | G01S 19/48 342/357.23 |
| 2012/0191272 A1* | 7/2012 | Andersen | G05D 1/0088 701/2 |
| 2012/0197519 A1* | 8/2012 | Richardson | G01C 21/3647 701/408 |
| 2012/0232792 A1* | 9/2012 | Ding | G01C 21/165 701/472 |
| 2013/0257649 A1* | 10/2013 | Chang | G01C 21/3647 342/357.28 |
| 2013/0261969 A1* | 10/2013 | Nakamura | G01C 21/3602 701/533 |
| 2015/0253776 A1* | 9/2015 | Tojima | G05D 1/0214 701/50 |

FOREIGN PATENT DOCUMENTS

| | | | | |
|---|---|---|---|---|
| JP | 3706907 | | 10/2005 | |
| JP | 2008-070653 | | 3/2008 | |
| JP | 2013-068482 | | 4/2013 | |
| WO | WO 2012086054 A1 * | 6/2012 | | G01C 21/3602 |

\* cited by examiner

FIG.4
| MARKER ID | MARKER CHARACTERISTIC INFORMATION |
|---|---|
| 0 | 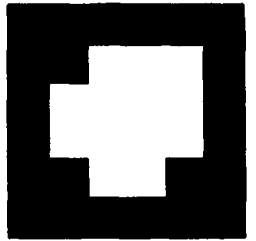 |
| 1 | 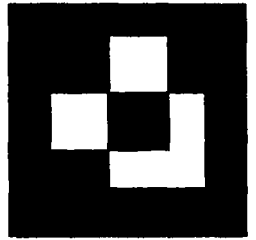 |
| 2 | 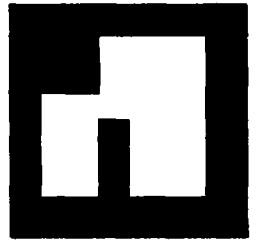 |
| 3 | 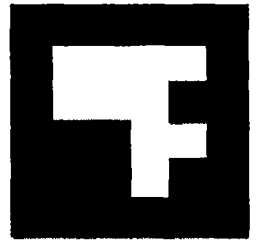 |
| . . . | |

WORLD GEODETIC SYSTEM

FIG.6

| MARKER ID | MARKER POSITIONAL INFORMATION | | |
|---|---|---|---|
| | LATITUDE(DEG) | LONGITUDE(DEG) | ALTITUDE(mm) |
| 0 | 35.459876 | 139.388274 | 873 |
| 1 | 35.459962 | 139.388400 | 1241 |
| 2 | 35.459098 | 139.388639 | 2186 |
| 3 | 35.459360 | 139.388071 | 3256 |
| . . . | | | |

WORLD COORDINATE SYSTEM

FIG.9

| MARKER ID | MARKER COORDINATE SYSTEM TRANSFORMATION INFORMATION ||||||
| | ROTATION ANGLE(DEG) ||| MOVED DISTANCE(mm) |||
| | AROUND X AXIS | AROUND Y AXIS | AROUND Z AXIS | X AXIS DIRECTION | Y AXIS DIRECTION | Z AXIS DIRECTION |
|---|---|---|---|---|---|---|
| 0 | 0 | 0 | 0 | 0 | 0 | 0 |
| 1 | −0.6 | +3.4 | +2.1 | +125 | −90 | +71 |
| 2 | +15.3 | −8.9 | +20.7 | −1089 | +716 | +1365 |
| 3 | +3.8 | +35.5 | −10.1 | +547 | +580 | −283 |
| ... | | | | | | |

FIG.10

$$\begin{pmatrix} X_w \\ Y_w \\ Z_w \\ 1 \end{pmatrix} = \begin{bmatrix} {}^m r_w(11) & {}^m r_w(12) & {}^m r_w(13) & {}^m t_w(X) \\ {}^m r_w(21) & {}^m r_w(22) & {}^m r_w(23) & {}^m t_w(Y) \\ {}^m r_w(31) & {}^m r_w(32) & {}^m r_w(33) & {}^m t_w(Z) \\ 0 & 0 & 0 & 1 \end{bmatrix} \begin{pmatrix} X_m \\ Y_m \\ Z_m \\ 1 \end{pmatrix}$$

WORLD COORDINATE SYSTEM = ROTATION ELEMENT | TRANSLATION ELEMENT — TRANSFORMATION MATRIX ${}^m T_w$ — MARKER COORDINATE SYSTEM

FIG.14

$$\begin{pmatrix} X_m \\ Y_m \\ Z_m \\ 1 \end{pmatrix} = \begin{bmatrix} {}^c r_m(11) & {}^c r_m(12) & {}^c r_m(13) & {}^c t_m(X) \\ {}^c r_m(21) & {}^c r_m(22) & {}^c r_m(23) & {}^c t_m(Y) \\ {}^c r_m(31) & {}^c r_m(32) & {}^c r_m(33) & {}^c t_m(Z) \\ 0 & 0 & 0 & 1 \end{bmatrix} \begin{pmatrix} X_c \\ Y_c \\ Z_c \\ 1 \end{pmatrix}$$

MARKER COORDINATE SYSTEM

ROTATION ELEMENT

TRANSLATION ELEMENT

CAMERA COORDINATE SYSTEM

TRANSFORMATION MATRIX ${}^cT_m$

CAMERA COORDINATE SYSTEM

FIG.16

$$\begin{pmatrix} X_w \\ Y_w \\ Z_w \\ 1 \end{pmatrix} = \begin{pmatrix} {}^c r_w(11) & {}^c r_w(12) & {}^c r_w(13) & {}^c t_w(X) \\ {}^c r_w(21) & {}^c r_w(22) & {}^c r_w(23) & {}^c t_w(Y) \\ {}^c r_w(31) & {}^c r_w(32) & {}^c r_w(33) & {}^c t_w(Z) \\ 0 & 0 & 0 & 1 \end{pmatrix} \begin{pmatrix} X_c \\ Y_c \\ Z_c \\ 1 \end{pmatrix}$$

WORLD COORDINATE SYSTEM

ROTATION ELEMENT

TRANSLATION ELEMENT

CAMERA COORDINATE SYSTEM

TRANSFORMATION MATRIX ${}^cT_w = {}^mT_w \cdot {}^cT_m$

FIG.18
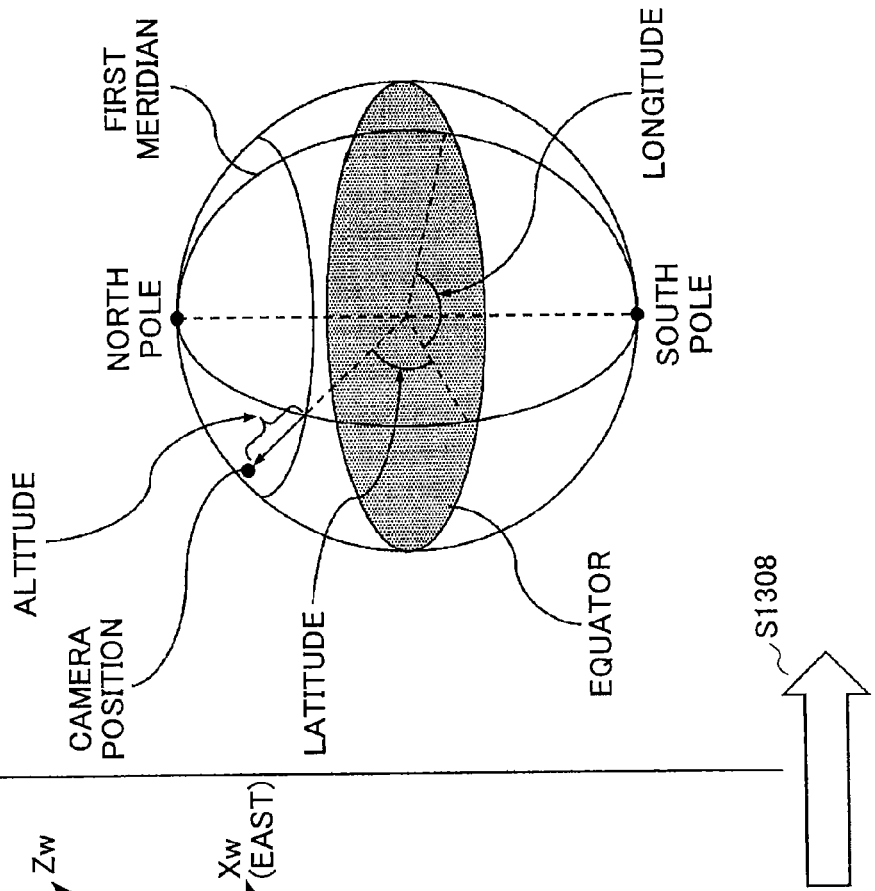
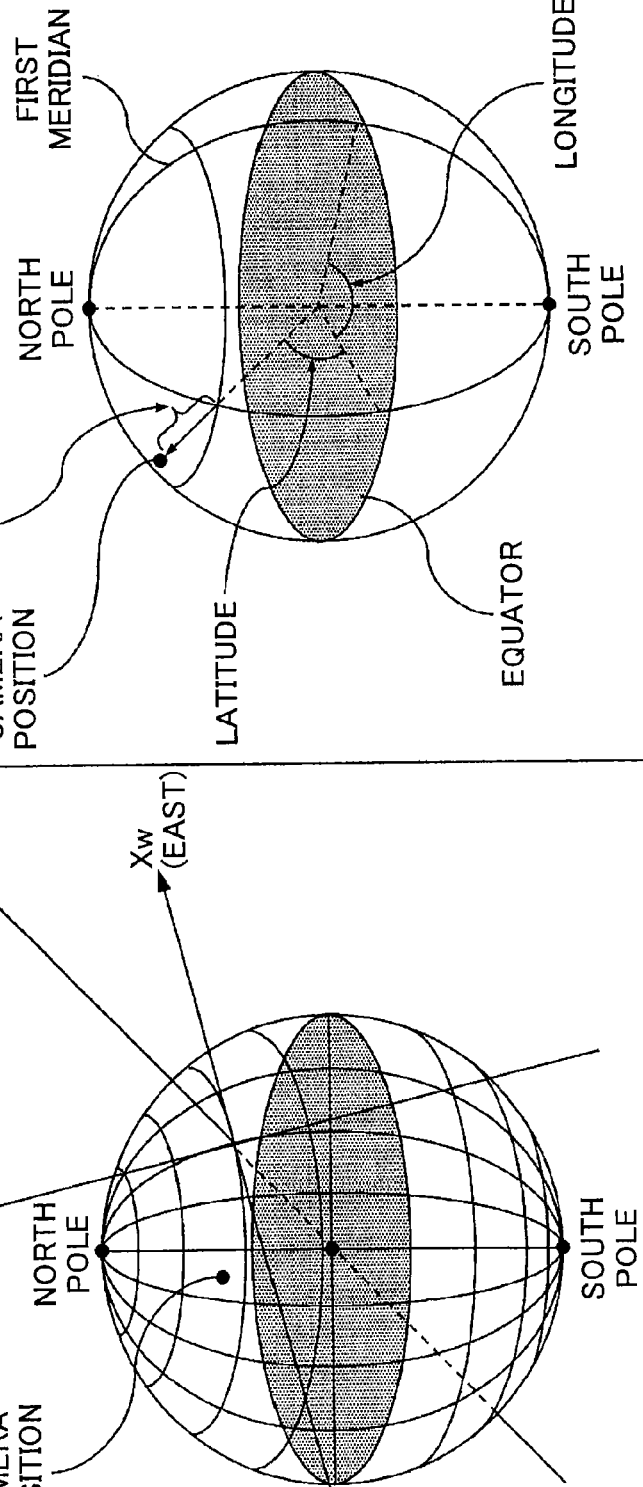

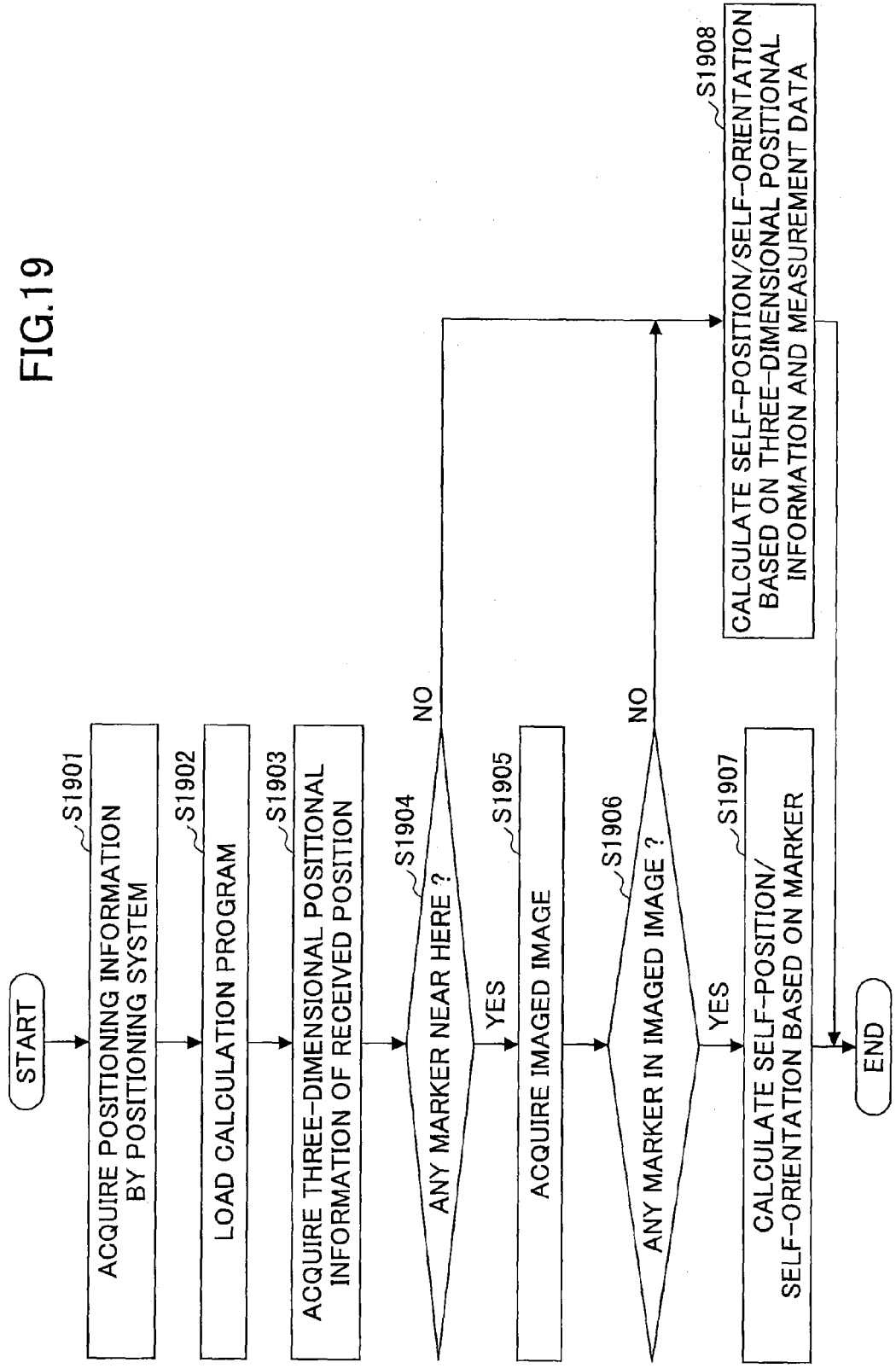

SELF-POSITION AND SELF-ORIENTATION BASED ON EXTERNALLY RECEIVED POSITION INFORMATION, SENSOR DATA, AND MARKERS

CROSS-REFERENCE TO RELATED APPLICATIONS

The present application is based on and claims the benefit of priority under 35 U.S.C §119 of Japanese Patent Application No. 2013-188553 filed Sep. 11, 2013, the entire contents of which are hereby incorporated herein by reference.

BACKGROUND OF THE INVENTION

1. Field of the Invention

The present invention generally relates to an information processing apparatus, a control method of the information processing apparatus, and a storage medium.

2. Description of the Related Art

Recently, an information processing apparatus has become more and more popular, having functions of displaying area information, such as facility information and road information, of the present location and guiding a route path to the destination (hereinafter referred to as "navigation device"). In such a navigation device, usually, a map of an area surrounding the present location is displayed on the display screen based on previously generated map data, and additional information such as the are information and the information necessary for a route guide (e.g., a route and distance to the destination and an arrow indicating the travelling direction) is superimposed on the map, so as to realize the function of the navigation device. Accordingly, to realize the function of the navigation device, it is necessary to have a function of displaying the location of the navigation device (hereinafter many be referred to as "self-position") and a function of indicating (displaying) the front direction of the navigation device (hereinafter many be referred to as "self-orientation").

Among such navigation devices, there has been proposed and known a navigation device that is equipped with a positioning system function such as a Global Positioning System (GPS), an Indoor Messaging System (IMES) or the like, and has an acceleration sensor and a gyro sensor.

SUMMARY OF THE INVENTION

According to an aspect of the present invention, an information processing apparatus estimating at least one of self-position and self-orientation in a predetermined coordinate system, includes a positioning information receiving unit receiving positioning information which is transmitted externally;

a received position identifying unit identifying a received position of the positioning information in the predetermined coordinate system based on the received positioning information;

a marker existence determination unit determining whether there exists at least one of different plural markers, which are disposed in a real world, within a predetermined area where the identified received position is set as a reference thereof;

an imaged image data acquisition unit acquiring imaged image data by causing an imaging device to image an oriented direction of the imaging device when it is determined that the marker exists within the predetermined area;

a marker image determination unit determining whether the marker is imaged in the acquired imaged image data; and a self-position/self-orientation calculation unit calculating at least one of the self-position and the self-orientation in the predetermined coordinate system, wherein, when it is determined that the marker exists within the predetermined area and it is also determined that the marker is imaged in the imaged image data, the self-position/self-orientation calculation unit calculates at least one of the self-position and the self-orientation based on the marker in the acquired imaged image data, and wherein, when it is determined that the marker does not exist within the predetermined area or when the marker is not imaged in the imaged image data, the self-position/self-orientation calculation unit calculates at least one of the self-position and the self-orientation based on received position information, which indicates the identified received position, and physical amounts which are measured by sensors for measuring the physical amounts to be used for autonomous navigation.

BRIEF DESCRIPTION OF THE DRAWINGS

Other objects, features, and advantages of the present invention will become more apparent from the following description when read in conjunction with the accompanying drawings, in which:

FIG. 4 is a drawing illustrating a marker characteristic information registration list according to an embodiment of the present invention;

FIG. 6 is a table illustrating an example of a marker positional information registration list according to an embodiment of the present invention;

FIG. 9 is a drawing illustrating an example of a marker coordinate system transformation information registration list according to an embodiment of the present invention;

FIG. 10 is a drawing illustrating a transformation matrix "$^m T_w$" according to an embodiment of the present invention;

FIG. 14 is a drawing illustrating a transformation matrix "$^c T_m$" according to an embodiment of the present invention;

FIG. 16 is a drawing illustrating a transformation matrix "$^cT_w$" according to an embodiment of the present invention;

FIG. 18 is a drawing visualizing the transformation process of the self-position and the self-orientation from the world coordinate system to the world geodetic system according to an embodiment of the present invention; and FIG. 19 is a flowchart of a process executed when the navigation device according to another embodiment of the present invention estimates the self-position and the self-orientation.

DETAILED DESCRIPTION OF THE PREFERRED EMBODIMENTS

Figure 1:
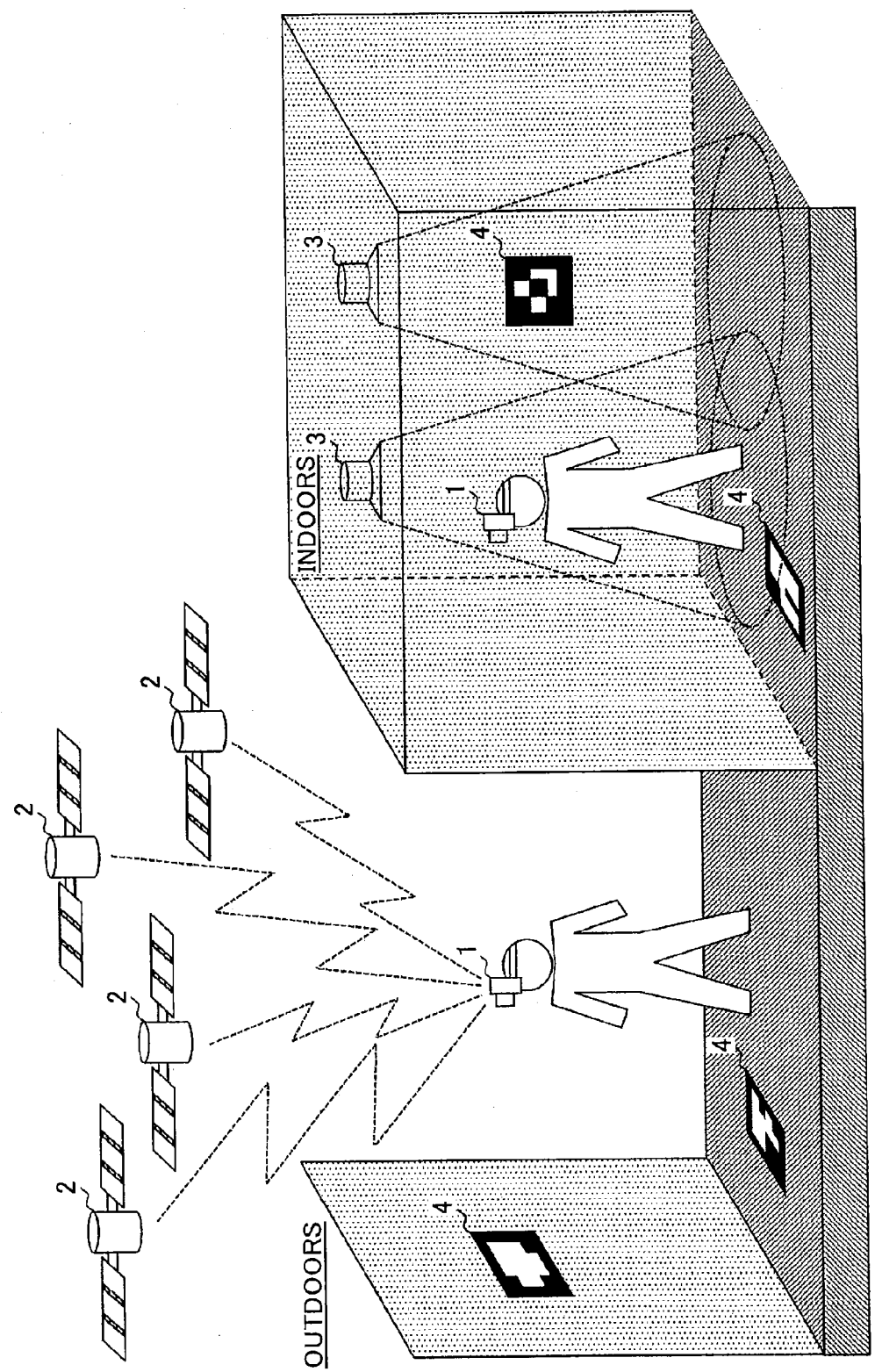
FIG. 1 is a drawing illustrating an operational form of a navigation system according to an embodiment of the present invention.

In related technologies, a navigation device estimates the self-position and the self-orientation based on three-dimensional positional information which is acquired from a positioning system. However, with the information alone, the self-position and the self-orientation cannot be estimated accurately due to errors in estimation accuracy. Therefore, the self-position and the self-orientation are estimated by using not only the information but also autonomous navigation based on a measurement result acquired from the acceleration sensor and the gyro sensor.

However, when such a navigation device is used in an environment where, for example, geomagnetism is affected so that electric and magnetic fields are generated or used in an inappropriate posture or slanted, whereas an error occurs in the sensor(s), the estimation accuracy in the estimation of the self-position and the self-orientation may be impaired.

In order to avoid the problem, there is already proposed a known navigation device, in which the markers disposed on roofs, roads, etc., are imaged so that the self-position and the self-orientation are estimated based on the angles related to the markers on generated imaged image data and the positions and orientations that are set to the markers (see, for example, Japanese Laid-open Patent Publication No. 2008-070653). Further, in such a navigation device, the self-position and the self-orientation are estimated by a matching process of matching between the coordinates of the markers in the coordinate system in the imaged image data and the coordinate of the markers in the coordinate system in the real world.

In such a navigation device as described in Japanese Laid-open Patent Publication No. 2008-070653, it is possible to estimate the self-position and the self-orientation without using the sensors. Accordingly, it becomes possible to obtain stable estimation accuracy regardless of the use environment.

In such a navigation device, if two or more markers are not included in the imaged image data when the front direction is imaged, it is not possible to estimate the self-position and the self-orientation. However, in order to make it possible that two or more markers are always included in the imaged image data, it is necessary to dispose an infinite number of markers in the real world. Therefore, it is not practically possible to estimate the self-position and the self-orientation in a wide area.

In order to avoid this problem, as described above, it is possible to estimate the self-position and the self-orientation by combinedly using the three-dimensional positional information and the autonomous navigation. However, in this case, as described above, when the navigation device is used in an environment where an error occurs in the sensor(s), the estimation accuracy in the estimation of the self-position and the self-orientation may be reduced.

The present invention is made in light of the above problems, and may provide an information processing apparatus (e.g., navigation device) and a method in which, in at least one of the estimation method of the self-position and the estimation method of the self-orientation, it is possible to effectively control in a case where the method of image processing using the imaged image data including a marker and the method of using a sensor detection result are used in combination. In the following, details of embodiments of the present invention are described with reference to the accompanying drawings. In this embodiment, an information processing apparatus having functions of, for example, displaying area information, such as facility information and road information, of an area surrounding the present location or guiding a route path to the destination (hereinafter referred to as "navigation device") is exemplarily described.

In the navigation device according to this embodiment, among plural different markers which are disposed in the real world and whose three-dimensional positional coordinates are known, the marker that exists in the front direction of the navigation device is imaged, so that at least one of the self-position and the self-orientation is estimated based on the imaged image data. Further, the navigation device according to this embodiment includes a geomagnetic sensor, a gyro sensor, and an acceleration sensor, so as to estimate at least one of the self-position and the self-orientation by the autonomous navigation using the measured data acquired from the sensors.

Namely, the navigation device according to this embodiment can estimate at least one of the self-position and the self-orientation by imaging a marker and performing image processing using the imaged image data or can estimate at least one of the self-position and the self-orientation by the autonomous navigation using the measured data acquired from the sensors (in each estimation).

In one overview (aspect) of this embodiment, the navigation device as described above can switch (select) one of the case where at least one of the self-position and the self-orientation is estimated by imaging a marker and performing image processing using the imaged image data and the other case where at least one of the self-position and the self-orientation by the autonomous navigation is estimated by the autonomous navigation using the measured data acquired from the sensors depending on usage conditions.

Therefore, in the navigation device according to this embodiment, it is not necessary to perform the imaging and the image processing whenever the self-position and the self-orientation are estimated. Accordingly, it is not necessary to drive the imaging device whenever the self-position and the self-orientation are estimated. Therefore, the workload of the arithmetic device can be reduced. By doing this, when the navigation device according to this embodiment can estimate at least one of the self-position and the self-orientation, it becomes possible to reduce the energy consumption and the processing time of the navigation device. Further, in a case where the navigation device according to this embodiment is used when the markers are not disposed or any marker cannot be imaged, the self-position and the self-orientation can be estimated by the autonomous navigation based on the detection results of the sensors. Namely, even in such a case, it becomes possible to estimate the self-position and the self-orientation. Due to this feature, it becomes possible for the navigation device according to this embodiment to estimate at least one of the self-position and the self-orientation in a wide area.

Further, in a case where the navigation device according to this embodiment is used under the environment where an error occurs in the sensor(s), the marker is imaged so that the self-position and the self-orientation are estimated based on the imaged image data. Namely, when the navigation device according to this embodiment is used even under such an environment, it becomes possible to estimate the self-position and the self-orientation without an error. Due to this feature, it becomes possible for the navigation device according to this embodiment to accurately estimate at least one of the self-position and the self-orientation regardless of the use environment.

As described above, according to this embodiment, in at least of an estimation method of estimating the self-position and an estimation method of estimating the self-orientation, it becomes possible to effectively control the operation of the navigation device in the case where the method of image processing using the imaged image data including a marker and the method of using a sensor detection result are used in combination.

First, an example operational form of a navigation system according to this embodiment is described with reference to FIG. 1. FIG. 1 illustrates an example operational form of the navigation system according to this embodiment. As illustrated in FIG. 1, in the navigation system according to this embodiment, a navigation device 1 is carried by a user, so that the navigation device 1 can acquire the positioning information from GPS satellite(s) 2 out of doors and acquire the positioning information from indoor GPS satellite(s) 3 indoors. Further, as illustrated in FIG. 1, in the navigation system according to this embodiment, plural markers are disposed inside and outside a building such as on a road and an outer wall and an inner wall, a floor, a ceiling (not shown) of the building.

The navigation device 1 is an information processing terminal such as a Personal Computer (PC), a cellular phone, a smartphone, a tablet terminal, a Personal Digital Assistant (PDA), a car navigation device, a Personal Navigation Device (PND), etc., having a GPS function. Note that the navigation device 1 according to this embodiment is not limited to such a mobile information processing terminal. For example, the navigation device 1 according to this embodiment may be a mountable information processing terminal mountable and used in a vehicle or on a motorcycle. Further, the navigation device 1 according to this embodiment includes an imaging device to image the front direction of the navigation device 1.

The GPS satellite 2 is a satellite in the GPS, and transmits the data, which includes the time information based on a highly-accurate atomic clock mounted therein, the ephemeris of all satellites with rough accuracy, and the ephemeris of the satellite, as the positioning information using a signal. By receiving the signal, the navigation device 1 can acquire the accurate three-dimensional positional information of the receiving point in the world geodetic system based on the positioning information from plural satellites. Namely, the navigation device 1 calculates the distances from the plural GPS satellite 2 based on the respective differences between the time when the signals are transmitted from the GPS satellites 2 and the time when the signals are received, and identifies the three-dimensional position at the received position in the world geodetic system based on the distance information.

The indoor GPS satellite 3 is a transmitter which is used in an Indoor Messaging System (IMES) that is one of the indoor positioning techniques that makes indoor positioning possible inside a building or indoors of an underground city where the receiving strength of the GPS signal is drastically reduced. Further, the indoor GPS satellite 3 transmits the positional information indicating the position of the indoor GPS satellite 3 as the positioning information in place of the time information and the ephemeris in the same radio format as that of the GPS satellite 2 using a signal. By receiving the signal, even indoors, it becomes possible for the navigation device 1 to receive an accurate three-dimensional position at the received position in the world geodetic system. Namely, the navigation device 1 identifies the three-dimensional position of the received position in the world geodetic system based on the positioning information transmitted from the indoor GPS satellite 3.

As described above, in the navigation system according to this embodiment, it becomes possible for the navigation device 1 to seamlessly acquire the three-dimensional positional information indoors and outdoors. Namely, in this embodiment, the positioning information is used as the received positional information indicating the received position. In the following, when it is not specifically necessary to distinguish GPS from IMES, those may be collectively called a "positioning system".

A marker 4 is an object that is used as a landmark in the navigation system according to this embodiment, so that plural markers 4 are disposed indoors and outdoors and have different characteristics. Due to the characteristics, when an object (i.e., the marker 4) is observed from any of the angles and from distances, it becomes possible for the navigation device 1 according to this embodiment to detect the object as the marker 4 and also identifies the marker 4.

Namely, the marker 4 according to this embodiment is a marker that can be detected as the marker 4 even when the navigation device 1 observes the marker 4 from any of the directions and from a distance, and can be identified as which of the markers 4. To that end, the feature includes, for example, the shape or the size of the marker 4, the mark, the design, the character, the character string, the symbol, the pattern, etc. printed on the marker 4, and any of the combination thereof. In this embodiment, sheet-like (planar) members having the feature are used as the markers 4. However, the present invention is not limited to the markers 4. For example, solid objects having the feature may be used.

Figure 2:
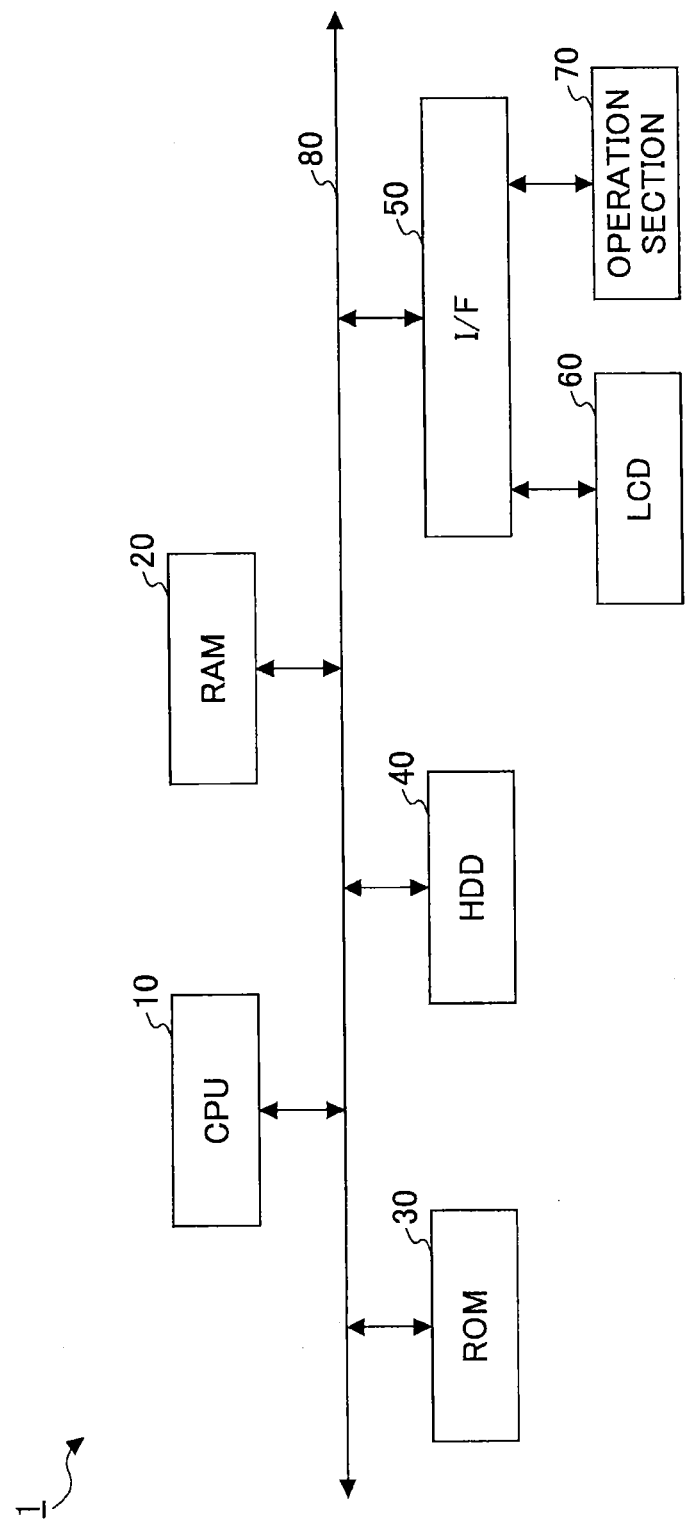
FIG. 2 is a block diagram of a schematic hardware configuration of the navigation device according to an embodiment of the present invention.

Next, an example hardware configuration of the navigation device 1 according to this embodiment is described with reference to FIG. 2. FIG. 2 is a block diagram schematically illustrating a hardware configuration of the navigation device 1 according to this embodiment.

As illustrated in FIG. 2, the navigation device 1 according to this embodiment includes a Central Processing Unit (CPU) 10, a Random Access Memory (RAM) 20, a Read-Only Memory (ROM) 30, a Hard Disk Drive (HDD) 40, and an I/F 50, which are connected to each other via a bus 80. The I/F 50 is connected to a Liquid Crystal Display (LCD) 60 and an operation section 70.

The CPU 10 is an arithmetic unit to control the operations of the entire navigation device 1. The RAM 20 is a volatile storage medium into and from which information can be rapidly written and read, and is used as a working area when the CPU 10 processes information. The ROM 30 is a non-volatile storage medium which is dedicated to read information from the ROM 30, and stores programs such as a firmware program. The HDD 40 is a non-volatile storage medium into and from which information can be written and read, and stores an Operating System (OS), various control programs, applications programs, and the like.

The I/F 50 is connected to and controls the bus 80, various hardware, a network, etc. The LCD 60 is a visual user interface so that the user can check the state of the navigation device 1. The operation section 70 is a user interface so that the user can input information into the navigation device 1.

In such a hardware configuration, a software control section is realized by loading a program stored in a storage medium such as the ROM 30, the HDD 40, an optical disk (not shown) to the RAM 20, and calculating based on the program by the CPU 10. Based on the combination of the software control section realized by doing in this way and the hardware elements, the functional block that realizes the navigation device 1 according to this embodiment can be provided.

Figure 3:
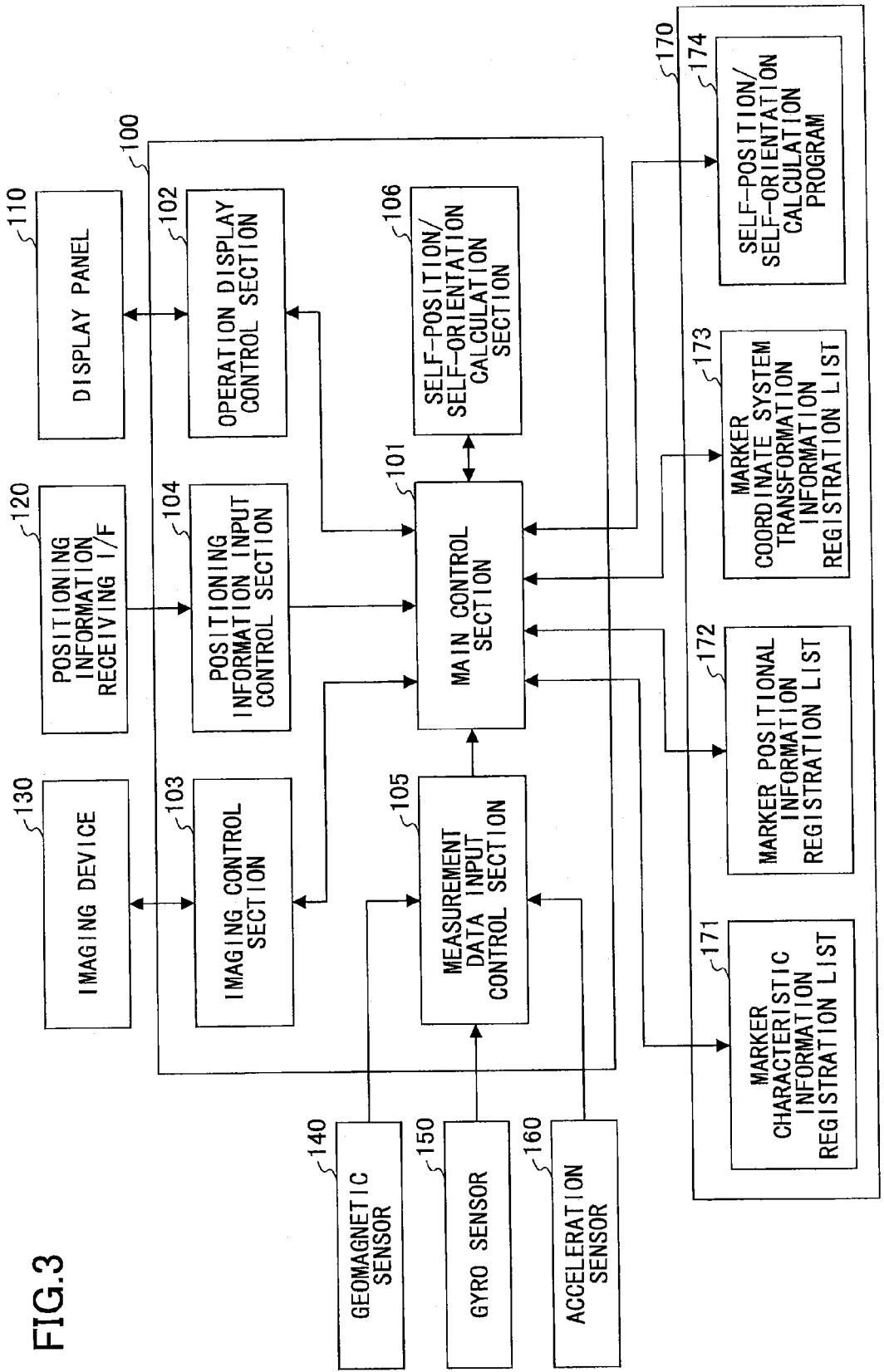
FIG. 3 is a block diagram of a schematic functional configuration of the navigation device according to an embodiment of the present invention.

Next, a functional configuration of the navigation device 1 according to this embodiment is described with reference to FIG. 3. FIG. 3 is a block diagram schematically illustrating a functional configuration of the navigation device 1 according to this embodiment. In FIG. 3, solid arrows are described to indicate electrical connections. As illustrated in FIG. 3, the navigation device 1 according to this embodiment includes a controller 100, a display panel 110, a positioning information receiving I/F 120, an imaging device 130, a geomagnetic sensor 140, a gyro sensor 150, and an acceleration sensor 160, and a storage section 170.

The controller 100 is realized by the combination of software and hardware. More specifically, the controller 100 is realized by the software control section and the hardware such as an integrated circuit, the software control section being realized by loading a control program, such as firmware stored in a non-volatile storage medium such as the ROM 30, the HDD 40, or the like, to the RAM 20, and calculating based on the program by the CPU 10. The controller 100 is functioned as a control section that controls the entire navigation device 1.

The controller 100, which is realized as described above, includes a main control section 101, an operation display control section 102, an imaging control section 103, a positioning information input control section 104, a measurement data input control section 105, and a self-position/self-orientation calculation section 106.

The main control section 101 has a role to control the sections included in the controller 100, and issues instructions to the sections of the controller 100. The operation display control section 102 displays information on the display panel 110 or notifies the main control section 101 of the information which is input via the display panel 110. The imaging control section 103 controls the imaging device 130. The imaging control section 103 inputs the imaged image data, which is imaged by operating the imaging device 130, into the main control section 101 as digital data.

The positioning information input control section 104 inputs the signal, which is transmitted from the GPS satellite 2 or the indoor GPS satellite 3 and received by the positioning information receiving I/F 120, into the main control section 101. The measurement data input control section 105 inputs the geomagnetic data, which are the measurement results by the geomagnetic sensor 140, the angular velocity data, which are the measurement results by the gyro sensor 150, and the acceleration data, which are the measurement results by the acceleration sensor 160, into the main control section 101.

The self-position/self-orientation calculation section 106 acquires the three-dimensional positional information at the received position of the above positioning information in the world geodetic system by calculating the positioning information received from the positioning system in accordance with a self-position/self-orientation calculation program 174 stored in the storage section 170.

Further, the self-position/self-orientation calculation section 106 calculates the self-position and the self-orientation in the world geodetic system by calculating the three-dimensional positional information, which is acquired from the positioning system, and the measurement data, which are input from the geomagnetic sensor 140, the gyro sensor 150, and the acceleration sensor 160, in accordance with the self-position/self-orientation calculation program 174 stored in the storage section 170. Namely, the navigation device 1 according to this embodiment estimates the self-position and the self-orientation in the world geodetic system by using the combination of the three dimensional positional information, which is acquired by the positioning system, and the autonomous navigation based on the measurement results input from the geomagnetic sensor 140, the gyro sensor 150, and the acceleration sensor 160.

As described above, the navigation device 1 according to this embodiment estimates the self-position and the self-orientation in the world geodetic system by using the combination of the three dimensional positional information, which is acquired by the positioning system, and the autonomous navigation. This is because when the self-position and the self-orientation in the world geodetic system are estimated based on only the three dimensional positional information acquired by the positioning system, the estimation accuracy may include an error.

Further, the self-position/self-orientation calculation section 106 calculates the self-position and the self-orientation in the world geodetic system by calculating the marker 4, which is imaged in the imaged image data acquired by the imaging device 130, in accordance with the self-position/self-orientation calculation program 174 stored in the storage section 170.

The display panel 110 is an output interface which visually displays the state of the navigation device 1 as well as an input interface as a touch panel so that a user can directly operate the navigation device 1 or input information into the navigation device 1. The display panel 110 is realized by the LCD 60 and the operation section 70 of FIG. 2.

The positioning information receiving I/F 120 is the interface so that the navigation device 1 can receive the signal transmitted from the GPS satellite 2 or the indoor GPS satellite 3. The positioning information receiving I/F 120 is realized by the I/F 50 of FIG. 2. Namely, in this embodiment, the positioning information receiving I/F 120 serves as a positioning information receiving unit.

The imaging device 130 is a device for imaging the imaged image data using an imaging device (optical sensor), such as a Charged Coupled Device (CCD) image sensor or a Complementary Metal Oxide Semiconductor (CMOS) image sensor or the like, which converts an image (optical signal) into an electrical signal.

The geomagnetic sensor 140 measures the magnitude and the direction of the geomagnetic field at the present location of the navigation device 1. The gyro sensor 150 measures the angular velocity of the navigation device 1. The acceleration sensor 160 measures the acceleration of the navigation device 1.

The storage section 170 is realized by a non-volatile storage medium such as the HDD 40 of FIG. 2 or a Non-volatile Random Access Memory (NVRAM), and stores a marker characteristic information registration list 171, a marker positional information registration list 172, a marker coordinate system transformation information registration list 173, and the self-position/self-orientation calculation program 174.

The marker characteristic information registration list 171 is a list in which the information related to the characteristics of the markers 4 (hereinafter referred to as "marker characteristic information") is registered for each of the markers 4. Specifically, in the marker characteristic information registration list 171 according to this embodiment, the marker characteristic information for each of the markers 4 in association with the corresponding marker ID to identify the marker 4 is registered. Here, the "characteristic information" refers to the computer-recognizable data representing the feature described above such as, for example, the shape or the size of the marker 4, the mark, the design, the character, the character string, the symbol, the pattern, etc. printed on the marker 4, and any of the combination thereof.

An example of such a marker characteristic information registration list 171 is described in FIG. 4. FIG. 4 illustrates an example of the marker characteristic information registration list 171. Note that the marker characteristic information is actually registered in a form of computer-recognizable data as described above in the marker characteristic information registration list 171. FIG. 4 visually illustrates the marker characteristic information for explanatory purposes. By referring to the marker characteristic information registration list 171, the navigation device 1 recognizes the marker characteristic information of the marker 4, which is identified by the marker ID, based on the marker ID. Also, based on the marker characteristic information of the marker 4, the navigation device 1 recognizes the marker ID to identify the marker 4 having the marker characteristic information.

Figure 5:
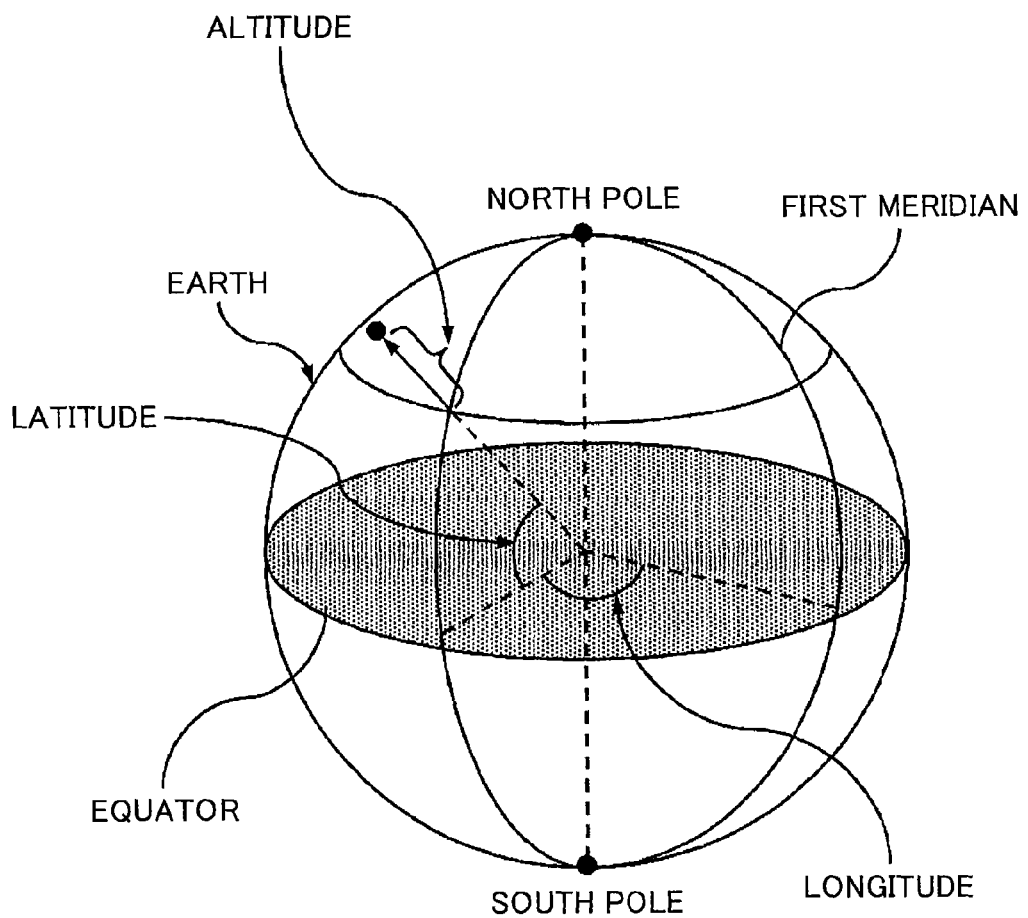
FIG. 5 is a drawing illustrating a world geodetic system.

The marker positional information registration list 172 is a list in which the information related to the three-dimensional positional information in the world geodetic system of the marker 4 (hereinafter "marker positional information") is registered for each of the markers 4. Here, the term "world geodetic system" refers to a coordinate system in which the position on the earth is defined by using the longitude, the latitude, and the altitude. Such a world geodetic system is illustrated in FIG. 5. FIG. 5 illustrates the world geodetic system.

Specifically, in the marker positional information registration list 172 according to this embodiment, as the marker positional information for each of the markers 4, the longitude (DEG), the latitude (DEG), and the altitude (mm) are registered in association with the marker ID for identifying the marker 4. An example of such a marker positional information registration list 172 is illustrated in FIG. 6. FIG. 6 illustrates an example of the marker positional information registration list 172 according to an embodiment.

Figure 7:
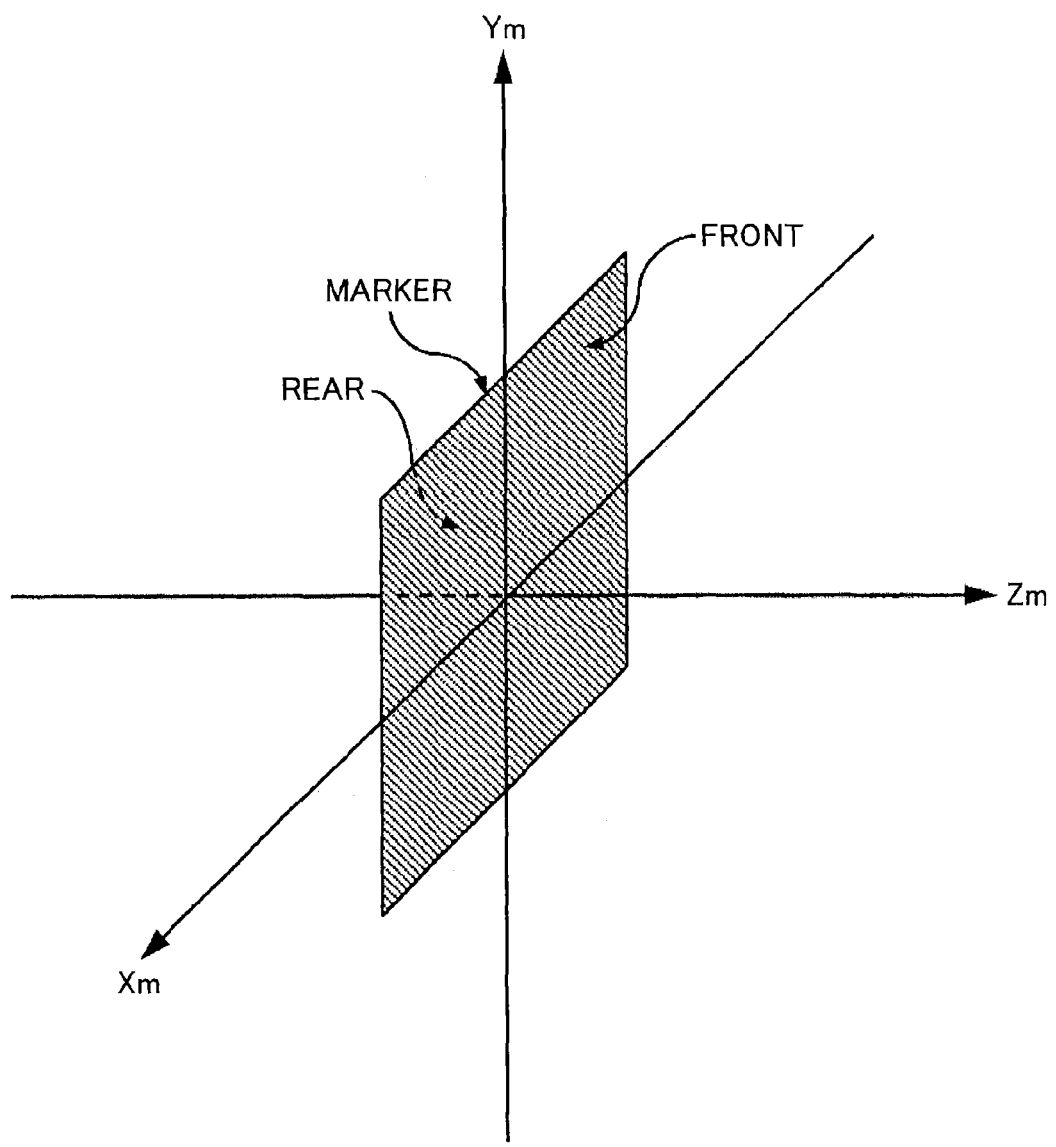
FIG. 7 is a drawing illustrating an example of a marker coordinate system according to an embodiment of the present invention.

The marker coordinate system transformation information registration list 173 is a list in which coordinate system transformation information for transforming the coordinate system which is set onto the marker 4 (as the reference) (hereinafter "marker coordinate system") into the world geodetic system (hereinafter "marker coordinate system transformation information") is registered for each of the markers 4. Here, the marker coordinate system refers to a coordinate system which is individually registered for each of the markers 4 and a three dimensional orthogonal coordinate system where the gravity center of the marker 4 is set to the origin. An example of the marker coordinate system according to this embodiment is illustrated in FIG. 7. FIG. 7 illustrates an example of the marker coordinate system according to this embodiment.

As illustrated in FIG. 7, the marker coordinate system according to this embodiment is defined by the Xm axis, the Ym axis, and the Zm axis which are orthogonal to each other at the origin. In such a marker coordinate system, a position on the earth is expressed as (Xm, Ym, Zm). However, as illustrated in FIG. 7, in the marker coordinate system according to this embodiment, the Zm axis is orthogonal to the plane of the marker 4, and the positive direction is in the direction from the rear surface to the front surface of the marker 4. Further, as illustrated in FIG. 7, the Xm axis and the Ym axis are parallel to the respective sides of the marker 4.

Figure 8:
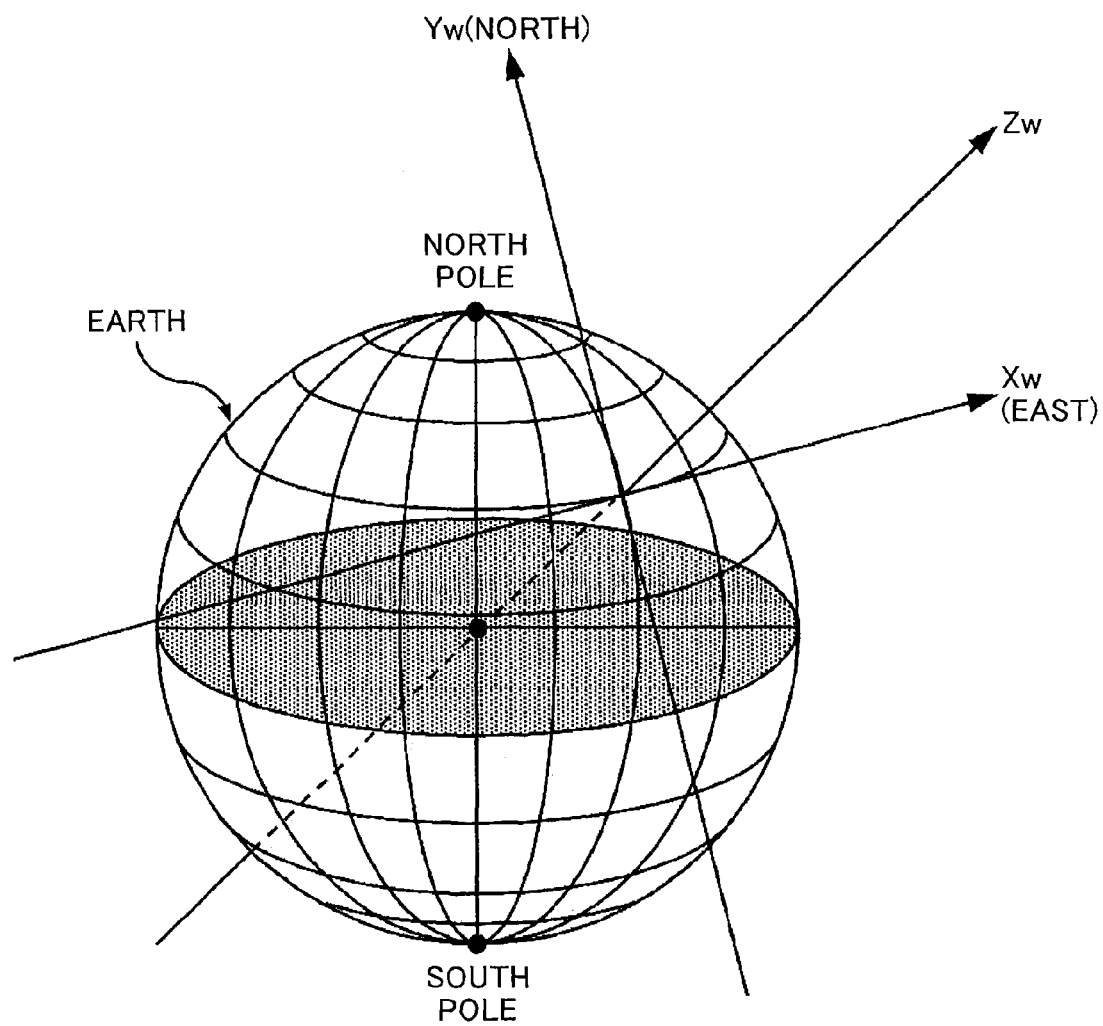
FIG. 8 is a drawing illustrating an example of a world coordinate system according to an embodiment of the present invention.

A world coordinate system is a three dimensional orthogonal coordinate system in which a predetermined position on the surface of the earth is set as the origin. An example of the world coordinate system according to this embodiment is illustrated in FIG. 8. FIG. 8 illustrates an example of the world coordinate system according to this embodiment. As illustrated in FIG. 8, the world coordinate system according to this embodiment is defined by the Xw axis, the Yw axis, and the Zw axis which are orthogonal to each other at the origin. In such a world coordinate system, a position on the earth is expressed as (Xw, Yw, Zw). However, as illustrated in FIG. 8, in the world coordinate system according to this embodiment, the Xw axis is in parallel to the plane which includes the South Pole, the North Pole, and the origin, and the direction to the North Pole is the positive direction. The Yw axis is in parallel to the east-west direction and the direction to the east is the positive direction. The Zw axis passes through the origin and the center of the earth, and the direction from the origin to the (cosmic) space is the positive direction.

Specifically, in the marker coordinate system transformation information registration list 173, the rotation angles around the X axis, the Y axis, and the Z axis (DEG) and the moving distances to the X axis, the Y axis, and the Z axis (mm) as the marker coordinate system transformation information for each of the markers 4 in association with the marker ID for identifying the marker 4 is registered. An example of the marker coordinate system transformation information registration list 173 according to this embodiment is described in FIG. 9. FIG. 9 illustrates an example of the marker coordinate system transformation information registration list 173 according to this embodiment.

By referring to such a marker coordinate system transformation information registration list 173, the navigation device 1 can generate a transformation matrix "$^{m}T_{w}$" for transforming the marker coordinate system into the world coordinate system for each of the markers 4. Here, the transformation from the marker coordinate system into the world coordinate system is realized by rotation and translation. In this regard, as illustrated in FIG. 10, the transformation matrix "$^{m}T_{w}$" according to this embodiment is a 4 by 4 square matrix having a rotation element and a translation element, so as to be applied to the marker coordinate system to acquire the world coordinate system. FIG. 10 illustrates the transformation matrix "$^{m}T_{w}$" according to this embodiment. Namely, in this embodiment, the marker coordinate system transformation information is used as the first coordinate system transformation information and the marker coordinate system transformation information registration list 173 is used as the first coordinate system transformation information registration list.

The self-position/self-orientation calculation program 174 is a program to be used so that the self-position/self-orientation calculation section 106 can calculate the self-position and the self-orientation.

Figure 11:
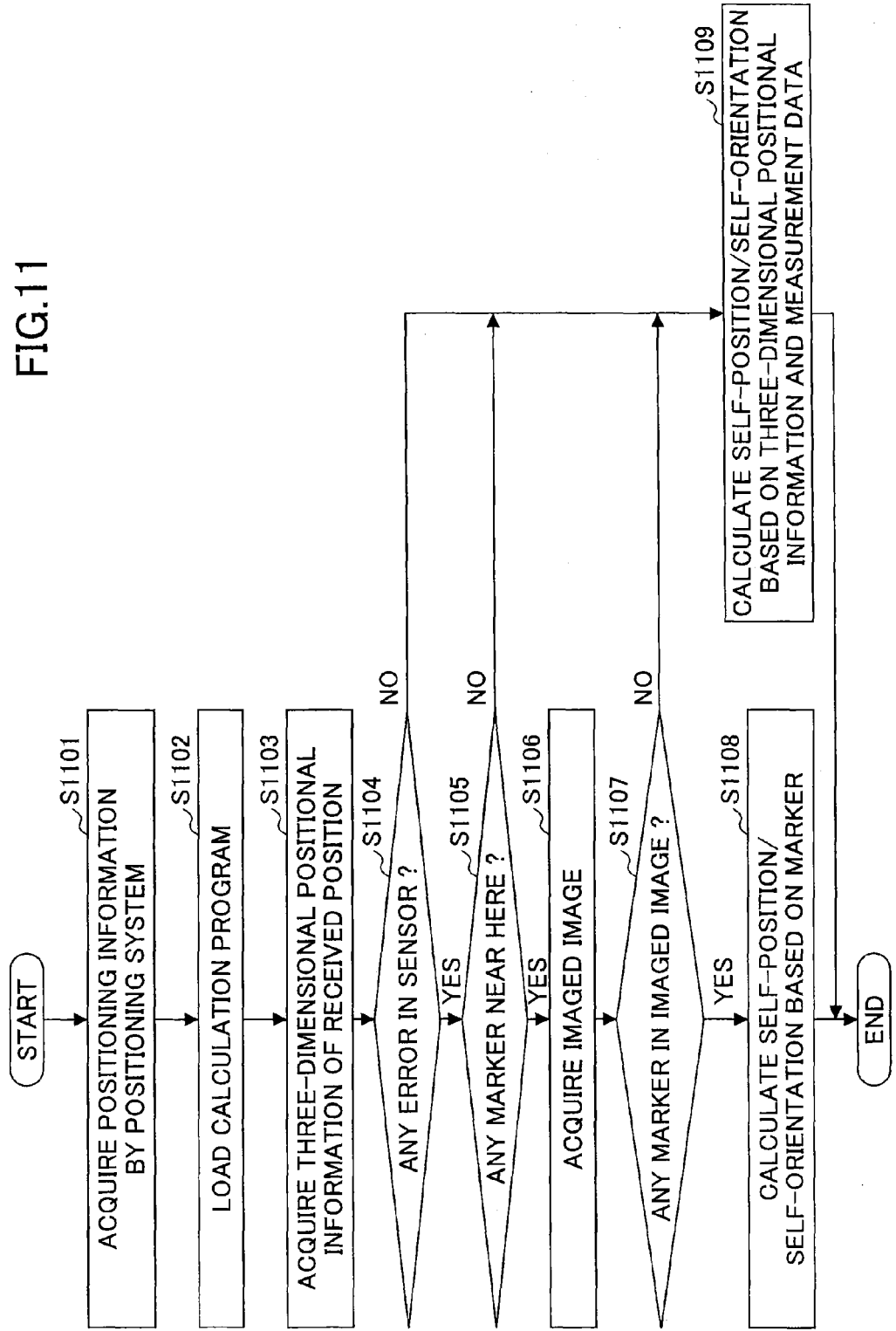
FIG. 11 is a flowchart of a process executed when the navigation device according to an embodiment of the present invention estimates self-position and self-orientation.

Next, the process when the navigation device 1 according to this embodiment estimates the self-position and the self-orientation is described with reference to FIG. 11. FIG. 11 is a flowchart of the process when the navigation device 1 according to this embodiment estimates the self-position and the self-orientation.

As illustrated in FIG. 11, in order for the navigation device 1 according to this embodiment to estimate the self-position and the self-orientation, first, the main control section 101 acquires the positioning information transmitted from the positioning system (step S1101). Upon receiving the positioning information, the main control section 101 reads (loads) the self-position/self-orientation calculation program 174 from the storage section 170 (step S1102).

Based on the positioning information acquired in step S1101, the main control section 101 causes the self-position/ self-orientation calculation section 106 to calculate in accordance with the self-position/self-orientation calculation program 174 so as to acquire the three dimensional positional information at the received position of the positioning information in the world geodetic system (step S1103). Namely, in this embodiment, the main control section 101 serves as a received position identifying unit.

Upon the receipt of the three dimensional positional information at the received position by the positioning information, the main control section 101 determines whether, in the use environment, an error occurs in at least one of the geomagnetic sensor 140, the gyro sensor 150, and the acceleration sensor 160 (step S1104). Namely, in this embodiment, the main control section 101 is functioned as a use environment determination unit. When determining that, in the use environment, an error occurs in at least one of the geomagnetic sensor 140, the gyro sensor 150, and the acceleration sensor 160 (YES in step S1104), the main control section 101 further determines whether there exists the marker 4 in an area surrounding the present location based on the three-dimensional positional information acquired in step S1103 (step S1105). Namely, in this embodiment, the main control section 101 is functioned as a marker existence determination unit.

Here, in the process of step S1104, as an example where the an error occurs in at least one of the sensors, there is a case where, for example, the navigation device 1 is used in the use environment where geomagnetism is affected so that electric and magnetic fields are generated or where navigation device 1 is in an inappropriate posture or slanted. Details of the determination process in step S1105 is described below with reference to FIG. 12.

When the main control section 101 determines that there exists a marker 4 in an area surrounding the present location in the determination process of step S1105 (YES in step S1105), the main control section 101 controls and causes the imaging control section 103 to image the front direction of the navigation device 1 and acquires the imaged image data of the front direction (step S1106). Namely, in this embodiment, the main control section 101 is functioned as an imaged image data acquisition unit.

Upon acquiring the imaged image data, the main control section 101 determines whether there exists a marker 4 in the imaged image data (step S1107). Namely, in this embodiment, the main control section 101 is functioned as a marker image determination unit. When determining that there exists a marker 4 in the imaged image data, which is acquired in step S1106, in step S1107 (YES in step S1107), the main control section 101 calculates the self-position and the self-orientation in the world geodetic system by causing the self-position/ self-orientation calculation section 106 to calculate the imaged marker 4 in accordance with the self-position/self-orientation calculation program 174 loaded in step S1102 (step S1108). The self-position and the self-orientation that are calculated as described above correspond to the self-position and the self-orientation to be estimated. As described above, the navigation device 1 according to this embodiment ends the process of estimating the self-position and the self-orientation. Details of the calculation process in step S1108 are described blow with reference to FIG. 13.

On the other hand, when the main control section 101 determines that, in the use environment, an error does not occur in any of the sensors in the determination step S1104 (NO is step S1104), when the main control section 101 determines that marker 4 does not exist in the area surrounding the present location (NO in step S1105), or when determining that marker 4 does not exist in the imaged image data in the determination step S1107 (NO in step S1107), the main control section 101 calculates the self-position and the self-orientation in the world geodetic system by causing the self-position/self-orientation calculation section 106 to calculate the three-dimensional positional information, acquired in step S1103, and the measurement data, input from the geomagnetic sensor 140, the gyro sensor 150, and the acceleration sensor 160, in accordance with the self-position/self-orientation calculation program 174 loaded in step S1102. Namely, at this moment, the main control section 101 calculates the self-position and the self-orientation in the world geodetic system based on the combination of the three-dimensional positional information acquired by the positioning system and the autonomous navigation. The self-position and the self-orientation as calculated as described above correspond to the self-position and the self-orientation to be estimated. As described above, the navigation device 1 according to this embodiment ends the process of estimating the self-position and the self-orientation.

In the navigation device 1 as described above, an overview in this embodiment is to switch a case where at least one of the self-position and the self-orientation is estimated by imaging a marker 4 and performing image processing on the imaged image data including the marker 4 and a case where at least one of the self-position and the self-orientation is estimated by the autonomous navigation using the measurement results from the sensors in accordance with the use environment of the navigation device 1.

Therefore, in the navigation device 1 according to this embodiment, it is not always necessary for imaging and performing the image processing to estimate the self-position and the self-orientation so that it is not necessary to drive the imaging device and it becomes possible to reduce the workload of the arithmetic device. By doing this, when the navigation device 1 according to this embodiment estimates at least one of the self-position and the self-orientation, it becomes possible to reduce the energy consumption and the processing time as well.

Further, when the navigation device 1 according to this embodiment is used under the condition where no marker 4 is disposed or no marker 4 is imaged, the self-position and the self-orientation are estimated by the autonomous navigation using the measurement results from the sensors. Therefore, even under such conditions, it becomes possible to estimate the self-position and the self-orientation. By doing this, it becomes possible for the navigation device 1 according to this embodiment to estimate at least one of the self-position and the self-orientation in a wider range.

Further, when the navigation device 1 according to this embodiment is used in an environment where an error occurs in the sensors, the navigation device 1 according to this embodiment images a marker 4 and estimates the self-position and the self-orientation based on the imaged image data where the marker 4 is imaged. Therefore, even under such a use environment, it becomes possible to estimate the self-position and the self-orientation without an error. By doing this, it becomes possible for the navigation device 1 according to this embodiment to accurately estimate at least one of the self-position and the self-orientation regardless of the use environment.

As described above, according to this embodiment, in the estimation method of estimating at least one of the self-position and the self-orientation, it becomes possible to effectively control the case where the method by performing image processing on the imaged image data where the marker is imaged and the method by using the detection results from the sensors are used in combination.

Figure 12:
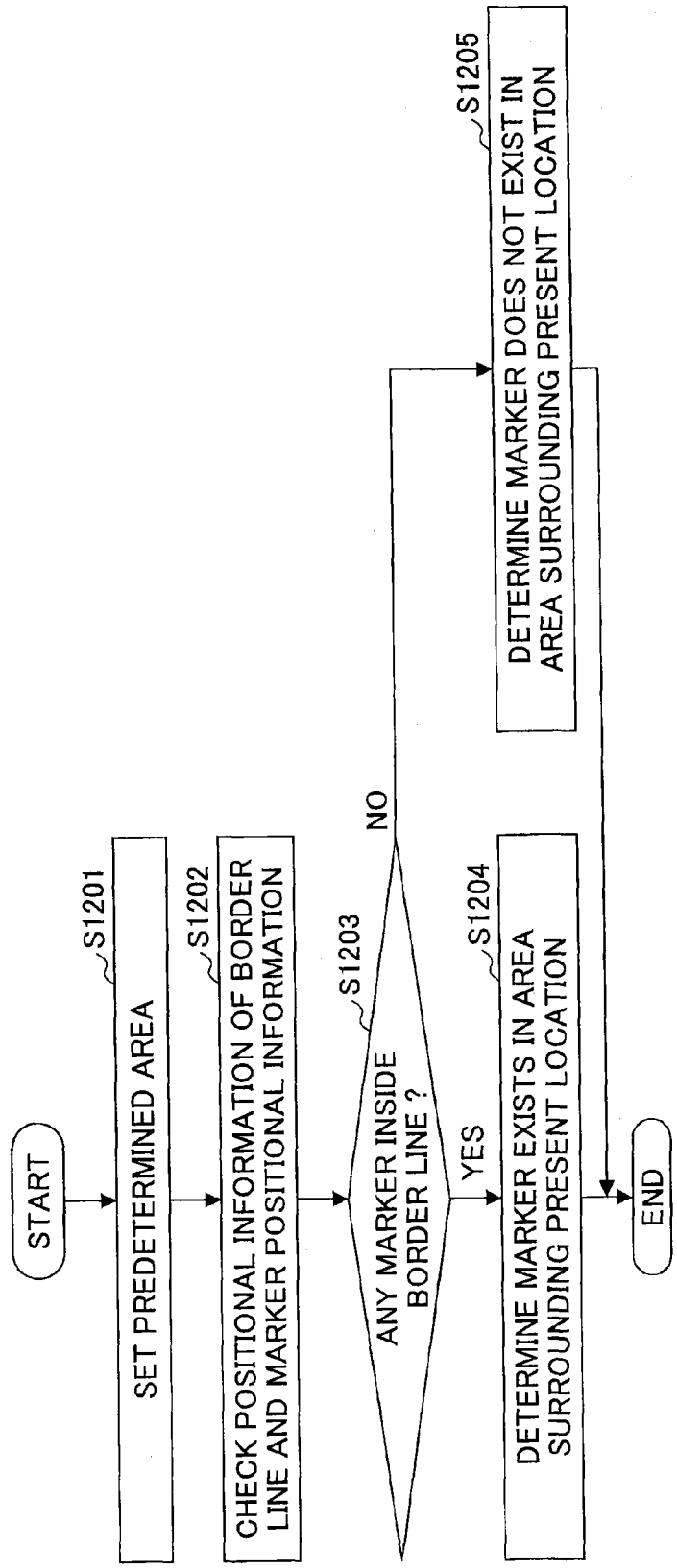
FIG. 12 is a flowchart of a process executed when the navigation device according to an embodiment of the present invention determines whether there exists a marker in an area surrounding the present location.

Next, the process when the navigation device 1 according to this embodiment determines whether there exists a marker 4 in an area surrounding the present location (i.e., a detail of the determination process in step S1105 of FIG. 11) is described with reference to FIG. 12. FIG. 12 is a flowchart illustrating a process where the navigation device 1 according to this embodiment determines whether there exists a marker 4 in the area surrounding the present location.

As illustrated in FIG. 12, in order for the navigation device 1 according to this embodiment to determine whether there exists a marker 4 in the area surrounding the present location, first, the main control section 101 regards the position that is identified by the three-dimensional positional information acquired in step S1103 of FIG. 11 (i.e., the received position) as the present location, and sets a predetermined range (area) where the present location is set as the reference (step S1201). Here, the predetermined range may be determined so that, for example, an error of the positioning system can be covered based on the consideration of the error of the positioning system, or may be determined by a user or a manager in advance.

After setting the predetermined range, the main control section 101 checks (refers to) the positional information of the markers 4 registered in the marker positional information registration list 172 and the three-dimensional positional information indicating the boundary line between the inside of the predetermined range set in step S1201 and the outside of the predetermined range (step S1202), and determines whether there exists a marker 4 inside the predetermined range (step S1203).

In the determination step in step S1203, when determining that there exists a marker 4 in the predetermined range (YES in step S1203), the main control section 101 assumes (determines) that there exists a marker 4 in the area surrounding the present location (step S1204). On the other hand, when determining that there exists no marker 4 in the predetermined range (NO in step S1203), the main control section 101 assumes (determines) that there is no marker 4 in the area surrounding the present location (step S1205). By doing this, the main control section 101 according to this embodiment ends the process of determining whether there exists a marker 4 in the area surrounding the present location.

Further, in the above description, a case is described where the the main control section 101 checks (refers to) the positional information of the markers 4 registered in the marker positional information registration list 172 and the three-dimensional positional information indicating the boundary line between the inside and the outside of the predetermined range in step S1202. However, as another example, in step S1202, the main control section 101 may check (refer to) the positional information of the markers 4 registered in the marker positional information registration list 172 and the three-dimensional positional information of a position included in the predetermined range set in step S1201. In this case, in step S1203, as the checked results in step S1203, the main control section 101 determines whether the marker 4, whose marker positional information corresponds to the three-dimensional positional information, is registered in the marker positional information registration list 172.

Further, when the main control section 101 determines that the marker 4, whose marker positional information corresponds to the three-dimensional positional information, is registered in the marker positional information registration list 172 in the determination step S1203, the main control section 101 assumes (determines) that there exists the marker 4 in the area surrounding the preset location in step S1204. On the other hand, when determining that such marker 4 is not registered in the marker positional information registration list 172, the main control section 101 assumes (determines) that there exists no marker 4 in the area surrounding the preset location in step S1205.

Figure 13:
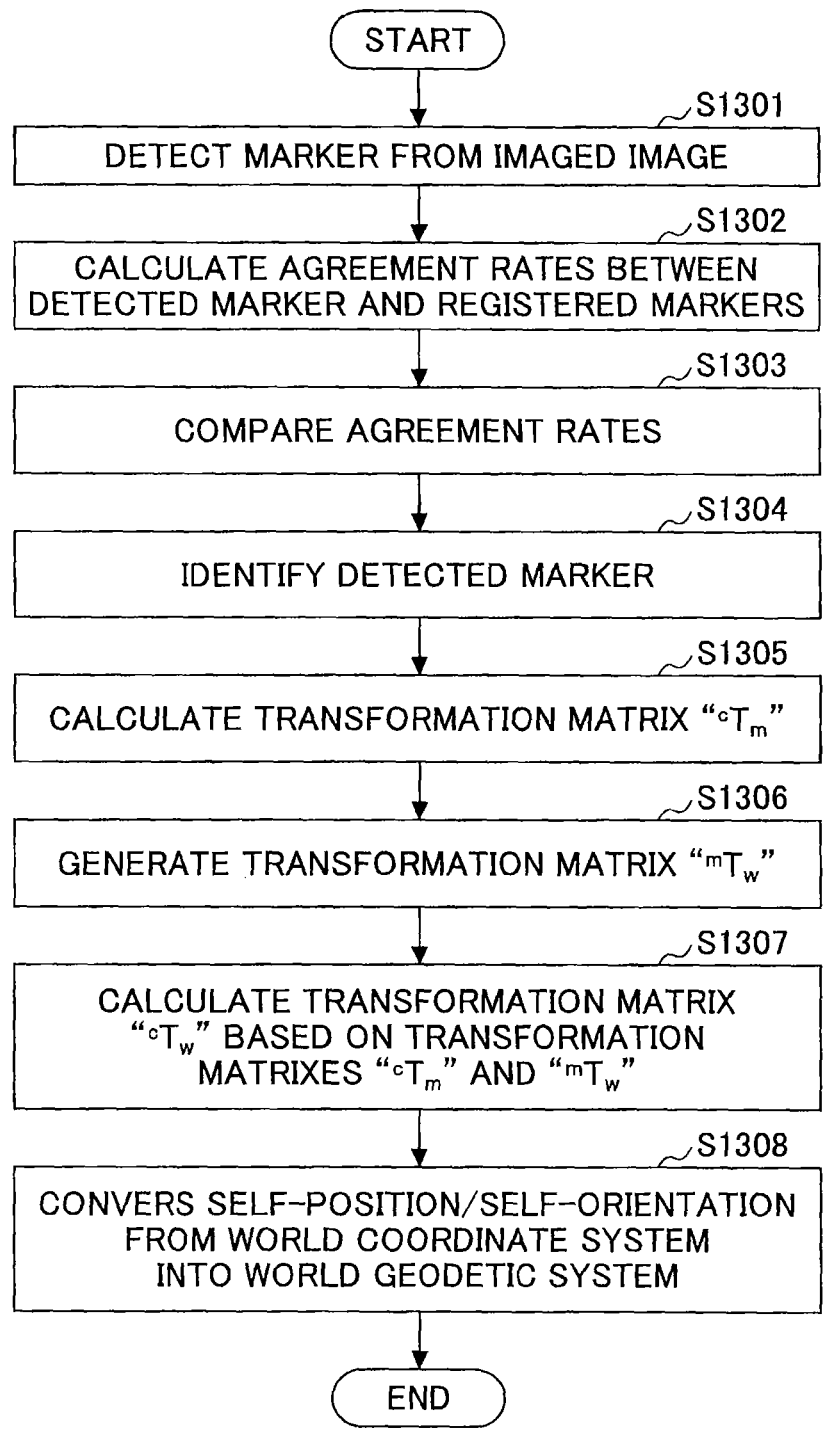
FIG. 13 is a flowchart of a process executed when the navigation device according to an embodiment of the present invention calculates the self-position and the self-orientation based on an imaging marker.

Next, the process in which the navigation device 1 according to this embodiment calculates the self-position and the self-orientation based on the imaged marker 4 (i.e., a detail of the calculation process in step S1108 of FIG. 13) is described with reference to FIG. 13. FIG. 13 is a flowchart illustrating a process when the self-position and the self-orientation are estimated based on the imaged marker 4.

As illustrates in FIG. 13, in order for the navigation device 1 according to this embodiment to calculate the self-position and the self-orientation based on the imaged marker 4, first, the main control section 101 detects a marker 4 from the imaged image data acquired in step S1106 of FIG. 11 (step S1301). The main control section 101 calculates an agreement rate between the marker characteristic information of the marker 4 detected in step S1301 and the marker characteristic information of each of the markers 4 registered in the marker characteristic information registration list 171 stored in the storage section 170 (step S1302).

Further, in the calculation process of calculating the agreement rate in step S1302, it is possible for the main control section 101 to calculate the agreement rates of the marker characteristic information of all the markers 4 registered in the marker characteristic information registration list 171. However, in this case, the processing time becomes longer and the energy consumption may be increased. To avoid such problems, in this embodiment, in step S1302, the main control section 101 calculates the agreement rates of the marker characteristic information of only the markers (target markers) that are possible to exist in the predetermined area which is set in step S1201 from among all the markers registered in the marker characteristic information registration list 171.

Further, the main control section 101 compares the agreement rates calculated in step S1302 (step S1303), and identifies (determines) the marker 4, which has the greatest agreement rate among all the target markers whose agreement rates are calculated, as the marker detected from the imaged image data in step S1301 (step S1304). Namely, in this embodiment, the main control section 101 is functioned as a marker identifying unit.

After identifying the marker 4, the main control section 101 calculates a transformation matrix "$^{c}T_{m}$" for transforming a camera coordinate system used when causing the imaging device 130 to image the front direction of the navigation device 1 in step S1106 into the marker coordinate system of the marker 4 identified in step S1304 (step S1305). Here, the transformation from the camera coordinate system into the marker coordinate system is realized by rotation and translation. In this regard, as illustrated in FIG. 14, the transformation matrix "$^{c}T_{m}$" according to this embodiment is a 4 by 4 square matrix having a rotation element and a translation element, so as to be applied to the camera coordinate system to acquire the marker coordinate system. Namely, in this embodiment, the transformation matrix "$^{c}T_{m}$" is used as the second coordinate system transformation information. FIG. 14 illustrates the transformation matrix "$^cT_m$" according to this embodiment.

Figure 15:
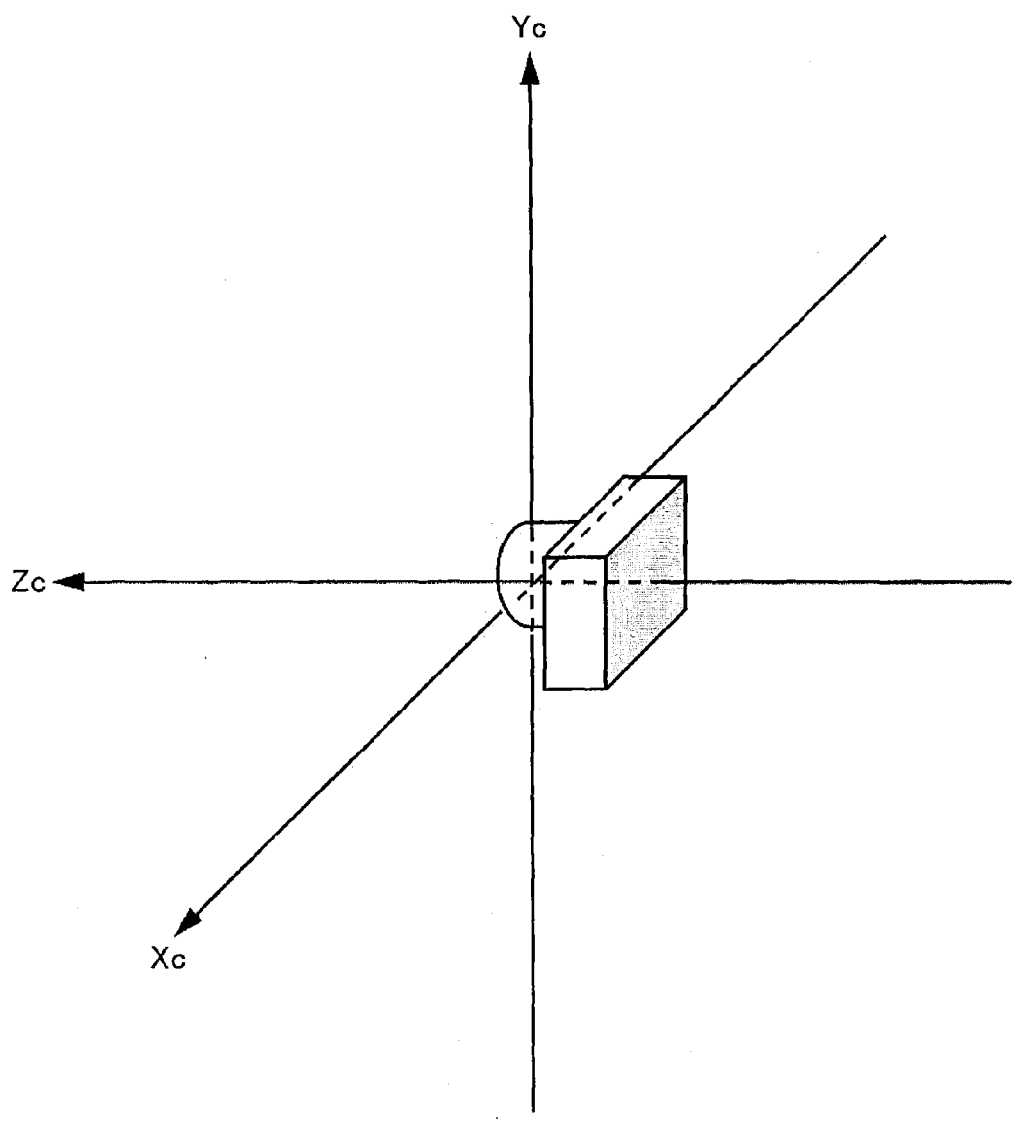
FIG. 15 is a drawing illustrating an example of a camera coordinate system according to an embodiment of the present invention.

Here, the camera coordinate system refers to the coordinate system using the imaging direction of the imaging device 130 as the reference and is the orthogonal coordinate system where the optical center of the camera is the origin. Namely, in this embodiment, the camera coordinate system is used as the imaging coordinate system. An example of the camera coordinate system according to this embodiment is illustrated in FIG. 15. FIG. 15 illustrates an example of the camera coordinate system according to this embodiment.

As illustrated in FIG. 15, the camera coordinate system according to this embodiment is defined by the Xc axis, the Yc axis, and the Zc axis which are orthogonal to each other at the origin. In such a camera coordinate system, a position on the earth is expressed as (Xc, Yc, Zc). However, as illustrated in FIG. 15, in the camera coordinate system according to this embodiment, the imaging direction of the imaging device 130 is defined as the Zc axis.

After calculating the transformation matrix "$^cT_m$", by referring to the marker coordinate system transformation information registration list 173, the main control section 101 generates the transformation matrix "$^mT_w$" for transforming the marker coordinate system of the marker 4 identified in step S1304 into the world coordinate system (step S1306).

After generating the transformation matrix "$^mT_w$", the main control section 101 calculates the transformation matrix "$^cT_w$" for transforming the camera coordinate system upon causing the imaging device 130 to image the front side of the navigation device 1 in step S1106 into the world coordinate system based on the transformation matrix "$^cT_m$" calculated in step S1305 and the transformation matrix "$^mT_w$" generated in step S1306 (i.e., based on "$^cT_m \cdot ^mT_w$").

Further, the transformation from the camera coordinate system to the world coordinate system according to this embodiment is realized by the rotation and the translation. In this regard, as illustrated in FIG. 16, the transformation matrix "$^cT_w$" according to this embodiment is a 4 by 4 square matrix having a rotation element and a translation element, so as to be applied to the camera coordinate system to acquire the world coordinate system. FIG. 16 illustrates the transformation matrix "$^cT_w$" according to this embodiment. Namely, in this embodiment, the transformation matrix "$^cT_w$" is used as the third coordinate system transformation information.

The transformation matrix "$^cT_w$" calculated here indicates the self-position and the self-orientation of the navigation device 1 in the world coordinate system. Namely, in the transformation matrix "$^cT_w$", the 3 by 1 matrix which is the translation element corresponds to the self-position of the navigation device 1 in the world coordinate system and the 3 by 3 square matrix which is the rotation element corresponds to the self-orientation of the navigation device 1 in the world coordinate system.

Figure 17:
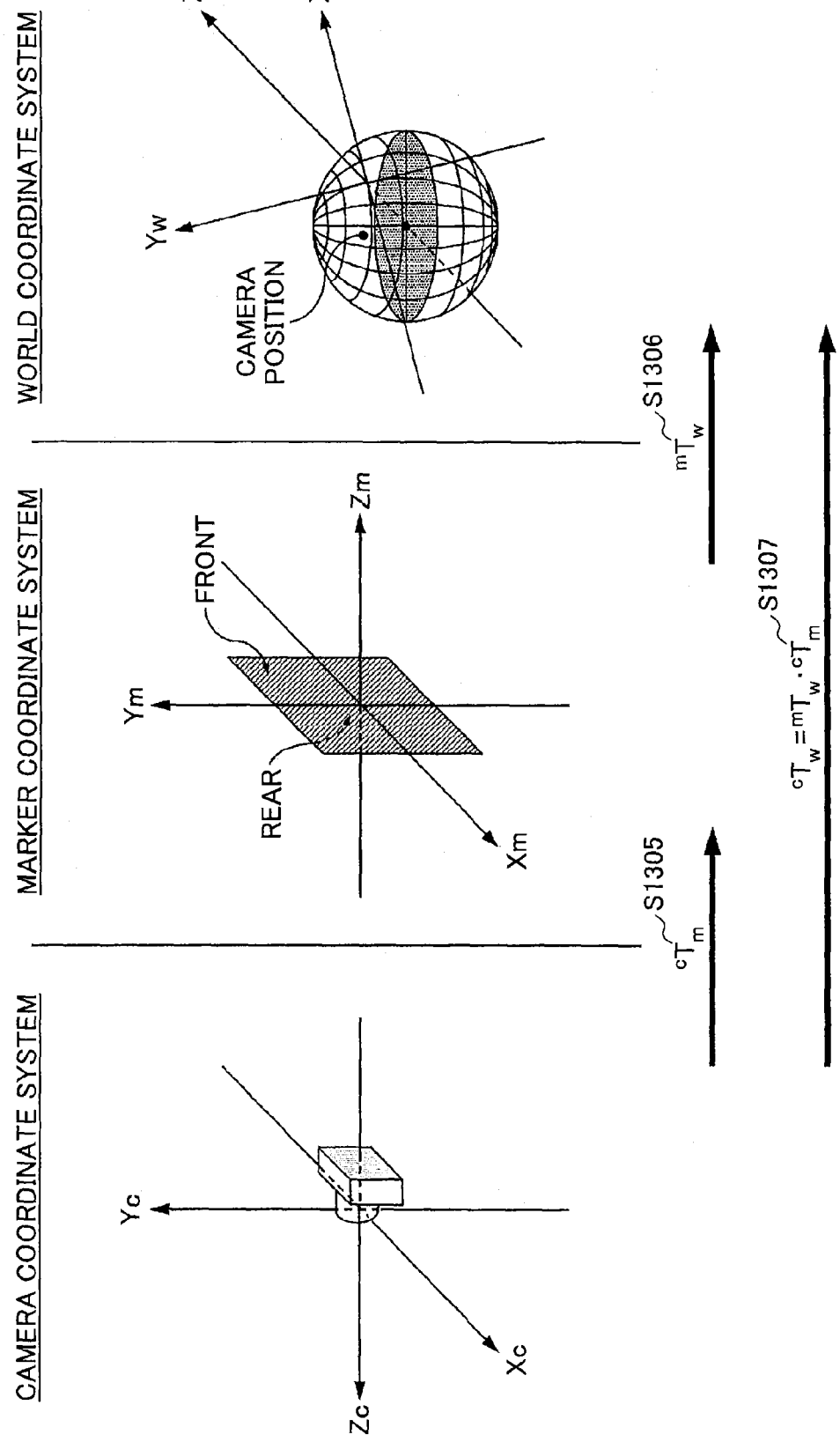
FIG. 17 is a drawing visualizing the transformation process between the coordinate systems according to an embodiment of the present invention.

Here the visualized processes in steps S1305, S1306, and S1307 are illustrated in FIG. 17. FIG. 17 illustrates the visualized transformation processes between the coordinate systems according to this embodiment.

Further, the main control section 101 converts (transforms) the self-position and the self-orientation of the navigation device 1 in the world coordinate system into the coordinate of the navigation device 1 in the world geodetic system based on the transformation matrix "$^cT_w$" calculated in step S1307 (step S1308).

Here, the visualized process in step S1308 is illustrated in FIG. 18. FIG. 18 illustrates the visualized transformation process of the self-position and the self-orientation according to this embodiment from the world coordinate system into the world geodetic system.

In this case, the conversion (transformation) of the self-orientation from the world coordinate system into the world geodetic system is similar to that illustrated in FIG. 8, so that the conversion is performed based on the rotation angles around the axes calculated from the 3 by 3 square matrix which is the rotation element in the transformation matrix of FIG. 16.

Further, in the conversion of the self-position from the world coordinate system into the world geodetic system, the latitude, the longitude, and the altitude in the world geodetic system to be acquired are given as "$\phi$", "$\lambda$", and "H", respectively. For example, the following formulas are used for the calculation.

$$\phi = \tan^{-1}\left\{\frac{Z_w}{(P - e^2 \cdot N \cdot \cos\phi_{i-1})}\right\} \quad (1)$$

$$\lambda = \tan^{-1}\frac{Y_w}{X_w} \quad (2)$$

$$H = \frac{P}{\cos\phi} - N - N_g \quad (3)$$

Further, the following formula is satisfied.

$$P = \sqrt{(X_w^2 + Y_w^2)} \quad (4)$$

Further, the above formula (1) is repeated until "$\phi$" converges so as to satisfy the formula (6), where "$\phi i$" is denotes the calculation result of ith cycle as described in formula (5).

$$\phi_0 = \tan^{-1}\frac{Z_w}{P} \quad (5)$$

$$|\phi_i - \phi_{i-1}| \leq 10^{-12} (\text{rad}) \quad (6)$$

As described, the navigation device 1 according to this embodiment ends the process of calculating the self-position and the self-orientation based on the imaged marker 4.

As described above, the navigation device 1 according to this embodiment can switch the case where at least one of the self-position and the self-orientation is estimated by imaging a marker 4 and performing the image processing on the imaged image data including the marker 4 and the case where at least one of the self-position and the self-orientation is estimated by the autonomous navigation using the measurement results from the sensors in accordance with the use environment of the navigation device 1.

Therefore, in the navigation device 1 according to this embodiment, it is not necessary to perform the imaging and the image processing whenever the self-position and the self-orientation are estimated. Accordingly, it is not necessary to drive the imaging device whenever the self-position and the self-orientation are estimated. Therefore, the workload of the arithmetic device can be reduced. By doing this, when the navigation device 1 according to this embodiment estimates at least one of the self-position and the self-orientation, it becomes possible to reduce the energy consumption and the processing time of the navigation device.

Further, in a case where the navigation device 1 according to this embodiment is used when the markers 4 are not disposed or any marker 4 cannot be imaged, the self-position and the self-orientation can be estimated by the autonomous navigation based on the detection results of the sensors. Namely, even in such a case, it becomes possible to estimate the self-position and the self-orientation. Due to this feature, it becomes possible for the navigation device 1 according to this embodiment to estimate at least one of the self-position and the self-orientation in a wider area.

Further, in a case where the navigation device 1 according to this embodiment is used under the environment where an error occurs in the sensor(s), the marker 4 is imaged so that the self-position and the self-orientation are estimated based on the imaged image data. Namely, when the navigation device 1 according to this embodiment is used even under such an environment, it becomes possible to estimate the self-position and the self-orientation without an error. Due to this feature, it becomes possible for the navigation device 1 according to this embodiment to accurately estimate at least one of the self-position and the self-orientation regardless of the use environment.

As described above, according to this embodiment, in at least of the estimation method of estimating the self-position and the estimation method of estimating the self-orientation, it becomes possible to effectively control the operation of the navigation device 1 in the case where the method of image processing using the imaged image data including the marker 4 and the method of using a sensor detection result are used in combination.

Further, in this embodiment, as described with reference to FIG. 13, a case is described where the self-position and the self-orientation of the navigation device 1 in the world geodetic system are estimated. Otherwise, the self-position and the self-orientation of the navigation device 1 in the world coordinate system may be estimated. In this case, when the navigation device 1 according to this embodiment calculates the self-position and the self-orientation, the navigation device 1 according to this embodiment does not perform the process in step S1308 of FIG. 13 and ends the process after performing the processes up to step S1307. In this case, the navigation device 1 according to this embodiment estimates the self-position and the self-orientation by assuming that the rotation angles around the axes calculated from the 3 by 3 square matrix which is the rotation element corresponds to the self-rotation and the moving distances in the axes directions acquired from the 3 by 1 matrix which is the translation element corresponds to the self-position.

Further, in this embodiment, as described with reference to FIG. 11, a case is described where, whether an error occurs in any of the sensors under the use environment is determined, and based on the determination result, and whether the estimation is to be done based on the marker 4 or based on the combination of the three-dimensional positional information and the autonomous navigation. In addition, as illustrated in FIG. 19, regardless of whether an error occurs in any of the sensors in the use environment, the navigation device 1 may determine whether the estimation is to be done based on the marker 4 or based on the combination of the three-dimensional positional information and the autonomous navigation. FIG. 19 is a flowchart of a process when the navigation device 1 according to another embodiment estimates the self-position and the self-orientation.

Further, in the above description with reference to FIG. 11, a case is described where it is determined that the marker 4 exists in the area surrounding the present location in the determination process of step S1105 (YES in step S1105), the surrounding image is automatically imaged. In another example, when it is determined that the marker 4 exists in the area surrounding the present location in the determination process of step S1105 (YES in step S1105), the determined result may be reported to the user so that the user can operate to image the surrounding image. In this case, the user of the navigation device 1 can image an image in the direction where the marker 4 exists. In this regard, when information such as an advertisement is placed near the marker 4 or in the direction of the marker 4, it becomes possible to attract attention to the information.

According to an embodiment, there is provided a method of controlling an information processing apparatus estimating at least one of self-position and self-orientation in a predetermined coordinate system, the method including:

receiving positioning information which is transmitted externally;

identifying a received position of the positioning information in the predetermined coordinate system based on the received positioning information;

determining whether there exists at least one of different plural markers, which are disposed in a real world, within a predetermined area where the identified received position is set as a reference thereof;

acquiring imaged image data by causing an imaging device to image an oriented direction of the imaging device when it is determined that the marker exists within the predetermined area;

determining whether the marker is imaged in the acquired imaged image data;

calculating, when it is determined that the marker exists within the predetermined area and it is also determined that the marker is imaged in the imaged image data, at least one of the self-position and the self-orientation based on the marker in the acquired imaged image data, and calculating, when it is determined that the marker does not exist within the predetermined area or when the marker is not imaged in the imaged image data, at least one of the self-position and the self-orientation based on received position information, which indicates the identified received position, and physical amounts which are measured by sensors for measuring the physical amounts to be used for autonomous navigation.

According to an embodiment, there is provided a non-transitory storage medium storing a computer-readable program causing an information processing apparatus estimating at least one of self-position and self-orientation in a predetermined coordinate system to execute a control method including:

receiving positioning information which is transmitted externally;

identifying a received position of the positioning information in the predetermined coordinate system based on the received positioning information;

determining whether there exists at least one of different plural markers, which are disposed in a real world, within a predetermined area where the identified received position is set as a reference thereof;

acquiring imaged image data by causing an imaging device to image an oriented direction of the imaging device when it is determined that the marker exists within the predetermined area;

determining whether the marker is imaged in the acquired imaged image data;

calculating, when it is determined that the marker exists within the predetermined area and it is also determined that the marker is imaged in the imaged image data, at least one of the self-position and the self-orientation based on the marker in the acquired imaged image data, and calculating, when it is determined that the marker does not exist within the predetermined area or when the marker is not imaged in the imaged image data, at least one of the self-position and the self-orientation based on received position information, which indicates the identified received position, and physical amounts which are measured by sensors for measuring the physical amounts to be used for autonomous navigation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus estimating at least one of self-position and self-orientation in a predetermined coordinate system, comprising:
    a positioning information receiving unit configured to receive positioning information which is transmitted externally;
    a received position identifying unit configured to identify a received position of the positioning information in the predetermined coordinate system based on the received positioning information;
    a marker existence determination unit configured to determine whether there exists at least one of different plural markers, which are disposed in a real world, within a predetermined area where the identified received position is set as a reference thereof;
    an imaged image data acquisition unit configured to acquire imaged image data by causing an imaging device to image an oriented direction of the imaging device when it is determined that the marker exists within the predetermined area;
    a marker image determination unit configured to determine whether the marker is imaged in the acquired imaged image data; and
    a self-position/self-orientation calculation unit configured to calculate at least one of the self-position and the self-orientation in the predetermined coordinate system,
    wherein, when it is determined that the marker exists within the predetermined area and it is also determined that the marker is imaged in the imaged image data, the self-position/self-orientation calculation unit is configured to calculate at least one of the self-position and the self-orientation based on the marker in the acquired imaged image data, and
    wherein, when it is determined that the marker does not exist within the predetermined area or when the marker is not imaged in the imaged image data, the self-position/self-orientation calculation unit is configured to calculate at least one of the self-position and the self-orientation based on received position information, which indicates the identified received position, and physical amounts which are measured by sensors for measuring the physical amounts to be used for autonomous navigation.

2. The information processing apparatus according to claim 1, further comprising:
    a use environment determination unit configured to determine whether an error greater than or equal to a predetermined amount occurs in any of the sensors under use environment,
    wherein, when it is determined that the error greater than or equal to the predetermined amount occurs in any of the sensors under the use environment, the marker existence determination unit is configured to determine whether the marker exists within the predetermined area, and
    wherein, when it is determined that the error greater than or equal to the predetermined amount does not occur in any of the sensors under the use environment, the self-position/self-orientation calculation unit is configured to calculate at least one of the self-position and the self-orientation based on received position information and the physical amounts measured by the sensors.

3. The information processing apparatus according to claim 1, further comprising:
    a marker identifying unit configured to, when it is determined that the marker is imaged in the imaged image data, identify the marker that is imaged therein,
    wherein the self-position/self-orientation calculation unit is configured to
        extract a first coordinate system transformation information of the identified marker from a first coordinate system transformation information registration list in which the first coordinate system transformation information for the markers are registered, the first coordinate system transformation information being for transforming a marker coordinate system, in which the marker is set as a reference thereof, into a world coordinate system,
        calculate a second coordinate system transformation information which is for transforming an imaging coordinate system, in which an imaging direction of the imaging device is set as a reference thereof when the imaging device is caused to acquire the imaged image data, into the marker coordinate system in which the identified marker is set as a reference thereof,
        calculate a third coordinate system transformation information which is for transforming the imaging coordinate system into the world coordinate system based on the extracted first coordinate system transformation information and the calculated second coordinate system transformation information,
        calculate rotation angles around axes in the world coordinate system from a rotation element which is included in the calculated third coordinate system transformation information as the self-orientation in the world coordinate system, and
        calculate moving distances to axis directions in the world coordinate system from a translation element which is included in the calculated third coordinate system transformation information as the self-position in the world coordinate system.

4. The information processing apparatus according to claim 3,
    wherein the self-position/self-orientation calculation unit is configured to
        calculate the self-orientation in the predetermined coordinate system based on the calculated rotation angles, and
        calculate the self-position in the predetermined coordinate system based on the calculated moving distances.

5. The information processing apparatus according to claim 3,
    wherein the marker identifying unit is configured to identify the marker that is imaged in the imaged image data by referring to a marker characteristic information registration list in which marker characteristic information indicating characteristics of the markers is registered.

6. The information processing apparatus according to claim 3,
wherein the marker identifying unit is configured to identify the marker that is imaged in the imaged image data by calculating an
an agreement rate between the marker characteristic information of the marker existing within the predetermined area among the markers and the marker characteristic information of the marker that is imaged in the imaged image data.

7. The information processing apparatus according to claim 1,
wherein the marker existence determination unit is configured to determine whether the marker exists within the predetermined area by referring to a marker positional information registration list in which marker positional information indicating the positions of the markers in the predetermined coordinate system is registered.

8. A method of controlling an information processing apparatus estimating at least one of self-position and self-orientation in a predetermined coordinate system, the method comprising:
receiving positioning information which is transmitted externally;
identifying a received position of the positioning information in the predetermined coordinate system based on the received positioning information;
determining whether there exists at least one of different plural markers, which are disposed in a real world, within a predetermined area where the identified received position is set as a reference thereof;
acquiring imaged image data by causing an imaging device to image an oriented direction of the imaging device when it is determined that the marker exists within the predetermined area;
determining whether the marker is imaged in the acquired imaged image data;
calculating, when it is determined that the marker exists within the predetermined area and it is also determined that the marker is imaged in the imaged image data, at least one of the self-position and the self-orientation based on the marker in the acquired imaged image data, and
calculating, when it is determined that the marker does not exist within the predetermined area or when the marker is not imaged in the imaged image data, at least one of the self-position and the self-orientation based on received position information, which indicates the identified received position, and physical amounts which are measured by sensors for measuring the physical amounts to be used for autonomous navigation.

9. A non-transitory storage medium storing a computer-readable program causing an information processing apparatus estimating at least one of self-position and self-orientation in a predetermined coordinate system to execute a control method comprising:
receiving positioning information which is transmitted externally;
identifying a received position of the positioning information in the predetermined coordinate system based on the received positioning information;
determining whether there exists at least one of different plural markers, which are disposed in a real world, within a predetermined area where the identified received position is set as a reference thereof;
acquiring imaged image data by causing an imaging device to image an oriented direction of the imaging device when it is determined that the marker exists within the predetermined area;
determining whether the marker is imaged in the acquired imaged image data;
calculating, when it is determined that the marker exists within the predetermined area and it is also determined that the marker is imaged in the imaged image data, at least one of the self-position and the self-orientation based on the marker in the acquired imaged image data, and
calculating, when it is determined that the marker does not exist within the predetermined area or when the marker is not imaged in the imaged image data, at least one of the self-position and the self-orientation based on received position information, which indicates the identified received position, and physical amounts which are measured by sensors for measuring the physical amounts to be used for autonomous navigation.

* * * * *